United States Patent
Chalana et al.

(10) Patent No.: US 12,008,038 B2
(45) Date of Patent: Jun. 11, 2024

(54) SUMMARIZATION OF VIDEO ARTIFICIAL INTELLIGENCE METHOD, SYSTEM, AND APPARATUS

(71) Applicant: Pictory, Corp., Bothell, WA (US)

(72) Inventors: Vikram Chalana, Bothell, WA (US); Vishal Chalana, Bothell, WA (US); Shailendra Singh, Hyderabad (IN); Abid Ali Mohammed, Bothell, WA (US)

(73) Assignee: Pictory, Corp.

( * ) Notice: Subject to any disclaimer, the term of this patent is extended or adjusted under 35 U.S.C. 154(b) by 175 days.

(21) Appl. No.: 17/569,386

(22) Filed: Jan. 5, 2022

(65) Prior Publication Data

US 2022/0215052 A1 Jul. 7, 2022

Related U.S. Application Data

(60) Provisional application No. 63/133,973, filed on Jan. 5, 2021.

(51) Int. Cl.
*G06F 16/738* (2019.01)
*G06F 16/75* (2019.01)
*G06F 16/783* (2019.01)
*G06N 3/045* (2023.01)
*G06N 3/08* (2023.01)

(52) U.S. Cl.
CPC ............ *G06F 16/739* (2019.01); *G06F 16/75* (2019.01); *G06F 16/7844* (2019.01); *G06N 3/045* (2023.01); *G06N 3/08* (2013.01)

(58) Field of Classification Search
CPC .... G06F 16/739; G06F 16/7844; G06F 16/75; G06N 3/045; G06N 3/08
See application file for complete search history.

(56) References Cited

U.S. PATENT DOCUMENTS

| | | | |
|---|---|---|---|
| 9,495,358 B2 | 11/2016 | Zuev et al. | |
| 11,095,468 B1* | 8/2021 | Pandey | ............... H04L 12/1831 |
| 2013/0325972 A1* | 12/2013 | Boston | ................... G06Q 10/10 709/204 |
| 2020/0043496 A1* | 2/2020 | Abdulkader | ........... G06N 20/20 |
| 2020/0117996 A1* | 4/2020 | Chang | ..................... G10L 15/16 |
| 2021/0383127 A1* | 12/2021 | Kikin-Gil | ............ G06V 10/811 |
| 2022/0067384 A1* | 3/2022 | Kaushik | ................ G06N 3/044 |

FOREIGN PATENT DOCUMENTS

| | | |
|---|---|---|
| WO | 2017124116 A1 | 7/2017 |
| WO | 2020222930 A1 | 11/2020 |

OTHER PUBLICATIONS

International Search Report dated Apr. 11, 2022, for PCT/US22/11332, filed Jan. 5, 2022.
Written Opinion dated Apr. 11, 2022, for PCT/US22/11332, filed Jan. 5, 2022.

* cited by examiner

*Primary Examiner* — Mishawn N. Hunter
(74) *Attorney, Agent, or Firm* — AEON Law, PLLC; Adam L. K. Philipp; Charlotte E Holoubek

(57) ABSTRACT

Methods, apparatus, and system to summarize an audio-visual media with a neural network machine learning architecture.

18 Claims, 9 Drawing Sheets

SUMMARIZATION OF VIDEO ARTIFICIAL INTELLIGENCE METHOD, SYSTEM, AND APPARATUS

CROSS-REFERENCE TO RELATED APPLICATIONS

This application is a non-provisional of, claims the benefit of the filing date of, and incorporates by reference the subject matter of U.S. provisional patent application Ser. No. 63/133,973, filed 2021 Jan. 5 (YYYY-MM-DD).

FIELD

The present disclosure relates to a computing device, in particular to a computing device to prepare a synopsis of audio-visual media using machine learning artificial intelligence, specifically, neural networks.

BACKGROUND

Digital video commonly comprises separately recorded and or encoded images and audio. The separately recorded and or encoded images and audio may be referred to as "tracks", as in a "video track" and an "audio track". In a video, the video track and audio track are commonly aligned or synchronized. An audio track and or a video track may be referred to herein, whether separately or synchronized together, as an audio-visual media.

Even when a person has access to and knowledge regarding how to use a video editing system, editing video is time consuming and computationally expensive. The editing process commonly comprises selecting start and stop locations in video and audio tracks ("cutting" the tracks), removing portions of tracks between the start and stop locations, creating transitions, and the like. Video editing systems commonly comprise multiple windows, multiple views of both video and audio tracks, and a complex user interface. Most people do not have access to and or knowledge regarding how to use video editing systems.

Preparation of a transcript corresponding to an audio track of a video may involve human transcribers or speech-to-text transcription software. Human transcription may be slow and or expensive. Speech-to-text transcription software may rely on human input and or may involve a recursive computational process to distinguish, for example, homophones (words which sound the same but have different meanings and may have different spellings; e.g. "to", "too", "two"), wherein selection of a spelling of text corresponding to a group of phonemes in an audio track is based on adjacent phonemes or adjacent word(s). Recursive processes allow adjacent phonemes or words to influence selection of a spelling for the group of phonemes, though recursive processes may be computationally expensive to execute.

Including a transcript along with a video further complicates the video editing process, at least because the transcript should be aligned with the audio track and video track, notwithstanding that reading a transcript may have a different pace in comparison to watching and listening to a video. When a portion of a video is removed, corresponding portions of a transcript should also be removed, which may require human input. Providing such functions further complicates a user interface for video editing systems.

Laptop computers, mobile phones, and the like now commonly comprise digital cameras and are now used by a large and increasing number of people and computer systems to record videos, including through use of videoconferencing applications such as ZOOM®, MICROSOFT® TEAMS, SLACK®, CISCO WEBEX® and the like. Search of and access to such videos would be aided if the videos had transcripts and if the videos had summaries, including video summaries. However, as noted above, existing video editing systems are difficult to use and or may be computationally expensive to execute.

DETAILED DESCRIPTION

Figure 1:
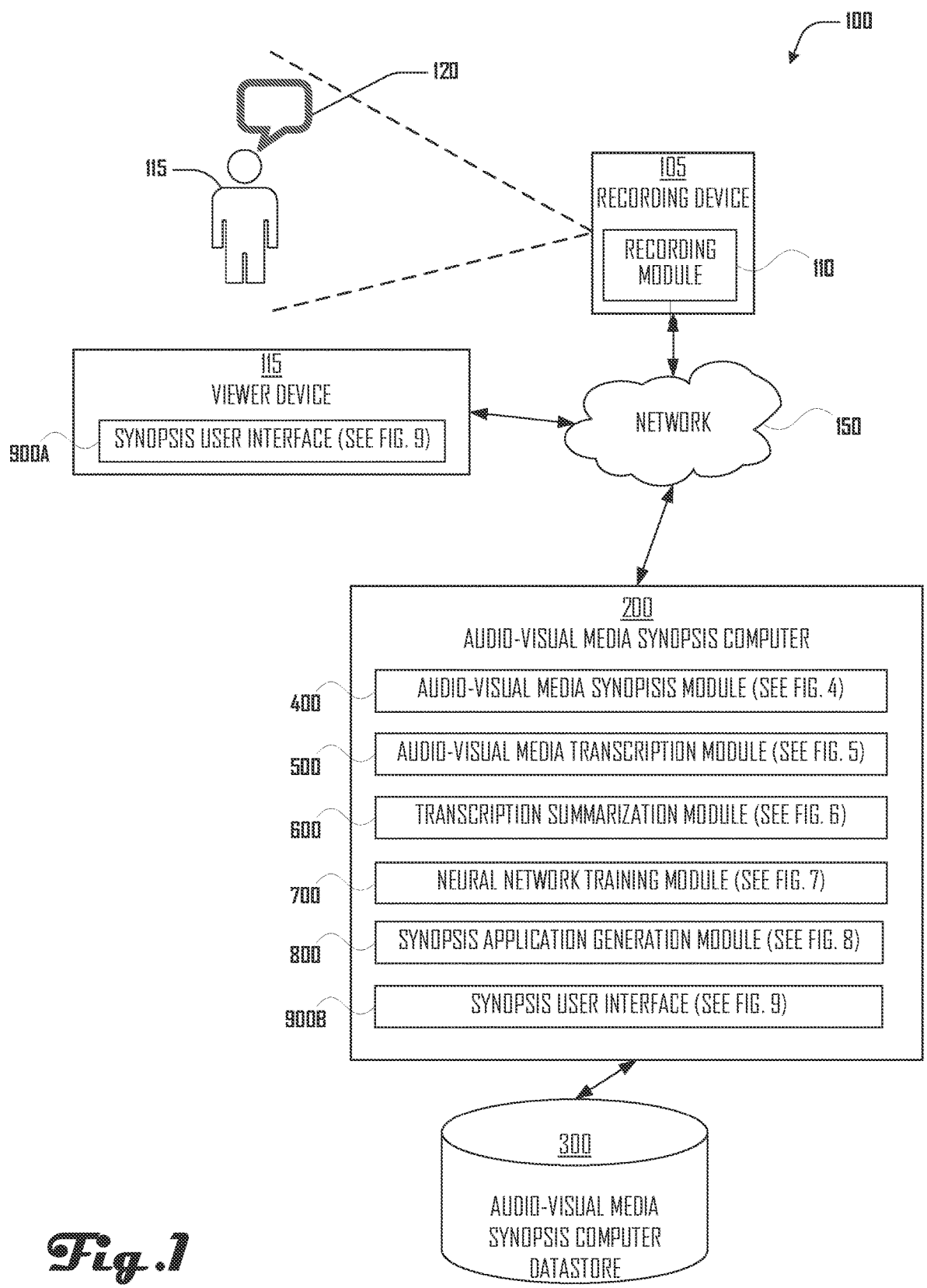
FIG. 1 is a network and device diagram illustrating an example of a video being recorded in a setting, a viewer device, an audio-visual media synopsis computer device, and a network incorporated with teachings of the present disclosure, according to some embodiments.

In addition to other locations, defined terms may be found at an end of this detailed description.

In overview, this disclosure relates to an apparatus and methods performed by and in a audio-visual media synopsis computer device apparatus 200. Audio-visual media synopsis computer device apparatus 200 may comprise a machine learning audio-visual media synopsis module 400, namely an audio-visual media synopsis module 400 comprising one or more neural networks. The neural networks may comprise a trained runtime of a transcription neural network (hereinafter, "transcription neural network") and a trained runtime of a summarization neural network (hereinafter, "summarization neural network"). The transcription neural network may be part of an audio-visual media transcription module 500. The summarization neural network may be part of transcription summarization module 600. Audio-visual media transcription module 500 and transcription summarization module 600 may be called as subroutines by, for example, audio-visual media synopsis module 400. The neural networks may comprise artificial neurons optimized to detect and classify objects, as may be found in a convolutional neural network and or the neural networks may be organized in a transformer architecture. When fed audio-visual media or vectors or tensors derived therefrom, the transcription neural network may identify words and sentences in a time series, also referred to herein as a transcript. When fed with the transcript or vectors or tensors derived therefrom and with audio-visual media or vectors or tensors derived therefrom, the summarization neural network may identify sentence meaning clusters or topics. The summarization neural network may comprise at least one of an unsupervised neural network and a supervised neural network. The unsupervised neural network may be a term frequency-inverse document frequency encoding neural network; the supervised network may be a summarization-trained neural network. A training dataset for the supervised network may comprises at least one of a plurality of audio-visual media and the transcript, wherein at least one of the plurality of audio-visual media and the transcript are annotated with a human feedback regarding summary status and not summary status.

Audio-visual media synopsis module 400 may feed the transcription neural network with audio-visual media from, for example, a live or pre-recorded performance, seminar, meeting, conference, other content source, or the like. The transcription neural network may process the audio-visual media and produce a transcript thereof. The transcript may comprise words and punctuation; the punctuation may organize the words into sentences. Audio-visual media synopsis module 400 may feed the transcript and the audio-visual media (or vectors or tensors derived therefrom) to the summarization neural network. The summarization neural network may process the transcript and the audio-visual media and prepare a transcript summary of the transcript of the audio-visual media. Audio-visual media synopsis module 400 may further prepare a video summary of the audio-visual media, wherein the video summary of the audio-visual media comprises portions of the audio-visual media corresponding to the transcript summary. Unlike abstractive paraphrased summarization, in which a body of text is condensed into alternative words, the transcript summary and the video summary prepared by audio-visual media synopsis module 400 comprise quotes extracted from the audio-visual media.

Audio-visual media synopsis module 400 may output the transcript, the transcript summary, and the video summary of the audio-visual media in, for example, synopsis user interface 900. Synopsis user interface 900 may obtain feedback from a viewer, such as, for example, a length of a synopsis, a portion of a transcript to include in or exclude from a transcript summary, a portion of an audio-visual media which the viewer finds to be a summary, and the like.

The neural networks may be arranged in, for example, a transformer architecture, wherein the transformer architecture may operate on audio-visual media in a parallel feed-forward process, without a computationally expensive recursive architecture.

The audio-visual media synopsis computer device apparatus may include one or more computer devices, each of which may perform some or all of audio-visual media synopsis module 400. For example, a mobile computer, such as a tablet or mobile phone, may be configured to operate as an audio-visual media synopsis computer device apparatus and to perform audio-visual media synopsis module 400. For example, a mobile computer may be configured to obtain one or more of an audio track and or a video track, perform one or more functions of audio-visual media synopsis module 400, transmit the audio track and or video track or an intermediate product thereof to a remote server computer, wherein the remote server computer performs additional functions of audio-visual media synopsis module 400 and may transmit results thereof back to the mobile computer for processing of additional functions of audio-visual media synopsis module 400 and or for display, such as in synopsis user interface 900.

A number of filters or layers, also referred to as a "depth" of a neural network, as well as a maximum number of nodes in each layer, also referred to as a "width" of a neural network, may depend on available compute resources in or for one or both of a training or a runtime compute environment. For example, a remote server computer or network thereof may have more compute resources to perform audio-visual media synopsis module 400 with greater depth and or width, in comparison to a mobile computer. In addition, a neural network, such as the transcription neural network or the summarization neural network, may be trained on specific vocabulary used by different communities; one or more topic-trained neural networks may be deployed with respect to different communities, whether by physical deployment to a device of such speaker or by network connection between such speaker and the topic-trained neural network(s).

Deep learning systems such as recurrent neural networks have been developed in which connections between nodes form a directed graph along a temporal sequence. Recurrent neural networks comprise memory or feedback loops, in which connections within hidden layers within a neural network feedback on themselves. A recurrent neural network may be visualized as multiple copies of a neural network, with the output of one neural network serving as input to a next neural network. These feedback loops produce a current state for a given input, wherein the current state is based at least in part on a previous hidden state of the data sample, thereby allowing recurrent neural networks to recognize patterns in data. Recursive neural networks may be understood as a type of recurrent neural network in which a set of weights are applied recursively over a differentiable graph-like structure by traversing the structure in topological order. For example, recursive neural networks successfully determine continuous representations of phrases and sentences based on word embeddings in natural language processing applications, such as translation, text prediction, syntactic parsing, and sentiment analysis. Word embeddings map words to vectors or tensors of real numbers, based on, for example, frequency of word co-occurrence.

However, recurrent neural networks, including recursive neural networks, require significant computational resources to train the neural network and to use the neural network to produce a result in a useful period of time.

More recently, machine learning transformer data processing architectures have been developed to parallel process input without a recursive architecture. For example, transformer architectures have been developed to perform neural network machine translation of natural languages, wherein words within an input sentence are processed in parallel in order to, for example, translate the input sentence into another language. Rather than using a recursive architecture to understand how the different words of the input sentence can be predicted relative to a word embedding matrix, transformer architectures use multiple "attention heads" to process the words (or groups of words) of the input sentence in parallel. Each attention head focuses on a specific word (or group of words) and determines the effect of other words in the input sentence on the specific word based on a weighting of the other words, wherein the weighting is normalized with, for example, a softmax function.

In this manner, transformer architectures can parallel process input data in series, without computationally expensive recursive processes, and can determine relationships among components of an input series, relative to a statistical model of a structure of the components (e.g. relative to a word embedding).

Transformer architectures are being refined to further reduce computational demands of specific steps. For example, softmax functions within transformer architectures may exhibit quadratic complexity with respect to length of input, e.g. $O(N^2)$, where N is the input sequence length. Techniques which incorporate assumptions, or which tradeoff some accuracy for reduced complexity, or which replace the quadratic step with a kernelized function and which approximate the softmax step with positive orthogonal random features have been developed which exhibit a transformer architecture with linear complexity with respect to length of input. In addition, training or "transfer learning" for layers within transformers can be accomplished through use of filter repositories; wherein encoder-decoder layers are deployed and wherein preliminary filters for the layers may be obtained from repositories. For example, preliminary filters may identify human speech, may identify words in human speech, and may identify sentences. Training of later, higher level, encoder-decoder layers may require training on specific tasks.

Audio-visual media synopsis computer device apparatus 200 may include a hardware acceleration module to accelerate the performance of the modules by hardware of audio-visual media synopsis computer device apparatus 200, for example, to allow an audio-visual media synopsis module 400 and transformer architectures therein to operate in what a user perceives as real time and or to accelerate performance of neural network training module 700.

In this way, audio-visual media synopsis computer device apparatus 200 and audio-visual media synopsis module 400 may provide a high level of accuracy in using a transcription neural network to produce a transcript corresponding to an audio-visual media and in using a summarization neural network to produce a transcript summary of the transcript and a video summary of the audio-visual media, wherein the summarization neural network prepares the transcript summary and the video summary by clustering sentences from the transcript in sentence meaning clusters and by selecting a number of sentences from each sentence meaning cluster, wherein selected sentences may be sentences categorized as summary sentences and wherein a length of the transcript summary may be influenced by a user selection of a desired length. Furthermore, audio-visual media synopsis module 400 may produce the video summary, wherein the video summary comprises portions of the audio-visual media corresponding to the transcript summary. Furthermore, in this way, audio-visual media synopsis computer device apparatus 200 and audio-visual media synopsis module 400 may allow a user to provide feedback to audio-visual media synopsis module 400. User feedback to audio-visual media synopsis module 400 may comprise, for example, a desired length of the transcript summary and or video summary of the audio-visual media, an instruction to include or exclude a portion of the audio-visual media from at least one of the transcript, the transcript summary, or the video summary, to include or exclude a portion of the transcript from at least one of the transcript summary or the video summary, or to exclude filler words from at least one of the transcript, the transcript summary, or the video summary.

FIG. 1 is a network and device diagram illustrating an example of recording device 105, audio-visual media synopsis computer 200, audio-visual media synopsis computer datastore 300, viewer device 115, and network 150, according to some embodiments.

In the example illustrated in FIG. 1, recording device 105 may be a computer device and or mobile computer device, such as a mobile phone, tablet, laptop computer, digital camera, and the like. Recording device 105 may comprise recording module 110; recording module 110 may be used to capture a digital audio-visual media track of, for example, person 115 and or audio track of speech 120 from person 115. The audio-visual media may be stored in one or more video 305 records in audio-visual media synopsis computer device datastore 300.

Figure 2:
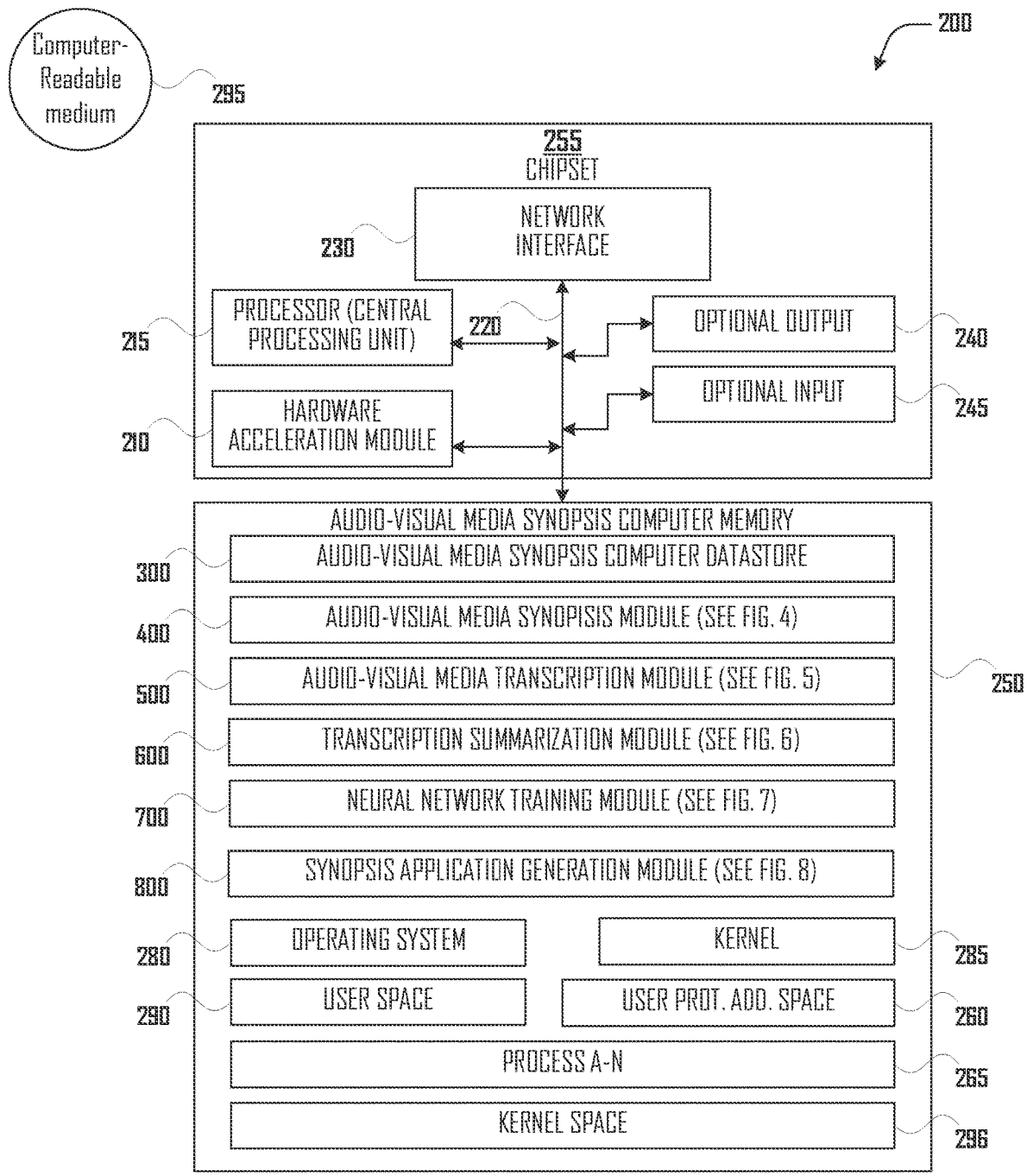
FIG. 2 is a functional block diagram illustrating an example of the audio-visual media synopsis computer device of FIG. 1, incorporated with teachings of the present disclosure, according to some embodiments.

Recording device 105 illustrated in FIG. 1 may connect with network 150 and/or audio-visual media synopsis computer 200, described further in relation to FIG. 2.

Viewer device 115 may be a computer device similar to audio-visual synopsis computer 200, e.g. a mobile phone, a laptop computer, a tablet computer, or the like, and may comprise, for example, a computer processor and memory. Viewer device 115 used by a person, generally referred to as a "user" to access and render, for example, the audio-visual media recorded by recording module 110 and or to interact with or perform audio-visual media synopsis module 400 through execution of, for example, synopsis user interface 900A. Modules, processes, or program code of or to enable synopsis user interface 900A may be present in memory of and performed by a computer processor of viewer device 115. Not illustrated in FIG. 1, viewer device 115 may further comprise in memory and may perform additional modules or processes, such as audio-visual media synopsis computer datastore 300, audio-visual media synopsis module 400, audio-visual media transcription module 500, transcription summarization module 600, neural network training module 700, synopsis application generation module 800, and or hardware acceleration module 210. As discussed herein, such modules may be distributed among multiple computer devices connected via, for example, network 150.

Audio-visual media synopsis computer 200 is illustrated as connecting to audio-visual media synopsis computer datastore 300. Audio-visual media synopsis computer datastore 300 is described further, herein, though, generally, should be understood as a datastore used by audio-visual media synopsis computer 200.

Audio-visual media synopsis computer 200 may be recording device 105, viewer device 115, and or audio-visual media synopsis computer 200 may be a separate server computer. One or more audio-visual media synopsis computer 200 may serve a plurality of recording devices 105 and or viewer devices 115.

Audio-visual media synopsis computer 200 is illustrated as comprising modules, such as audio-visual media synopsis module 400. In the examples illustrated herein, audio-visual media synopsis module 400 may utilize or call audio-visual media transcription module 500 and transcription summarization module 600. One or more such modules may call additional modules, such as an encoder-decoder module. The encoder-decoder module may call additional modules, such as an encoder module and decoder module.

Functions performed by audio-visual media synopsis module 400 and called modules may comprise the following: obtain an original video; obtain a desired length of a video summary to be prepared from the original video; call audio-visual media transcription module 500 to generate a transcript of an audio track in the original video; call transcription summarization module 600 to generate a transcript summary and a video summary from the transcription of the audio track and from the audio-visual media; output to a user, such as to synopsis user interface 900, the transcript, the transcript summary, and the video summary and may highlight portions of the transcript corresponding to the transcript summary; determine whether user changes are received in relation to the transcript and or transcript summary; determine whether filler words in the transcript are to be removed; and re-encoding and or output the video summary based on the user changes.

Thereby, audio-visual media synopsis computer 200 and modules thereof such as audio-visual media synopsis module 400 may prepare a transcript corresponding to an audio-visual media file, may prepare a transcript summary of the transcript, and may prepare a video summary of audio-visual media using neural networks, wherein the neural networks may comprise supervised and unsupervised neural networks, wherein the neural networks may be arranged in a transformer based machine learning process. The transformer based machine learning process may operate in parallel on input audio-visual media and on an audio track and or video track therein (or on vectors or tensors derived therefrom). A data processing architecture of the transformer based machine learning process utilized by audio-visual media synopsis computer 200 and audio-visual media synopsis module 400 may not be recursive but may be feed-forward. The data processing architecture of the transformer based machine learning process utilized by audio-visual media synopsis computer 200 and audio-visual media synopsis module 400 may be more efficient, may be faster, may be easier to train, may require fewer programmers to implement and maintain, may require reduced computational resources, may be easier to use, may base a number of meaning sentence clusters identified in an input audio track on a desired length of a transcription summary or percentage of audio-visual media, and may provide other benefits as may be described herein.

Functions performed by audio-visual media synopsis module 400 and called modules may be reorganized and still perform the functions outlined herein; e.g. one or more modules or functions thereof may be performed by one or more computer devices, such by viewer device 115, recording device 105 as across a network, such as network 150, and or modules or functions thereof may be performed in different modules than as illustrated and discussed and still achieve a similar result.

Network 150 may comprise computers, network connections among the computers, and software routines to enable communication between the computers over the network connections. Examples of network 150 comprise an Ethernet network, the Internet, and/or a wireless network, such as a GSM, TDMA, CDMA, EDGE, HSPA, LTE or other network provided by a wireless service provider. Connection to network 150 may be via a Wi-Fi connection. More than one network may be involved in a communication session between the illustrated devices. Connection to network 150 may require that the computers execute software routines which enable, for example, the seven layers of the OSI model of computer networking or equivalent in a wireless phone network.

FIG. 2 is a functional block diagram illustrating an example of audio-visual media synopsis computer 200, incorporated with teachings of the present disclosure, according to some embodiments. Audio-visual media synopsis computer 200 may comprise chipset 255. Chipset 255 may comprise processor 215, input/output (I/O) port(s) and peripheral devices, such as output 240 and input 245, and network interface 230, and computer device memory 250, all interconnected via bus 220. Network interface 230 may be utilized to form connections with network 150, with audio-visual media synopsis computer datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may comprise, for example, user interface device(s) including a display, a touch-screen display, printer, keypad, keyboard, etc., sensor(s) including accelerometer, global positioning system (GPS), gyroscope, digital camera, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by audio-visual media synopsis module 400, by modules which may be called by such module, and neural network training module 700.

Hardware acceleration module may be provided by, for example, Integrated Performance Primitives software library by Intel Corporation, as may be executed by an Intel (or other similar) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support tensor machine.

Hardware acceleration module 210 may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open-source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVllib, and others.

In embodiments, hardware acceleration module 210 may be or comprise a programmed field programmable gate array (FPGA), i.e., a FPGA in which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting computer device memory 250.

Computer device memory 250 may comprise a random access memory ("RAM"), a read only memory ("ROM"), and a permanent mass storage device, such as a disk drive or SDRAM (synchronous dynamic random-access memory). Computer device memory 250 may store program code for modules and/or software routines, such as, for example, hardware acceleration module 210, audio-visual media synopsis computer datastore 300 (illustrated and discussed further in relation to FIG. 3), audio-visual media synopsis module 400 (illustrated and discussed further in relation to FIG. 4), audio-visual media transcription module 500 (illustrated and discussed further in relation to FIG. 5), transcription summarization module 600 (illustrated and discussed further in relation to FIG. 6), neural network training module 700 (illustrated and discussed further in relation to FIG. 7), and synopsis application generation module 800 (illustrated and discussed further in relation to FIG. 8).

Computer device memory 250 may also store operating system 280. These software components may be loaded from a non-transient computer readable storage medium 295 into computer device memory 250 using a drive mechanism associated with non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
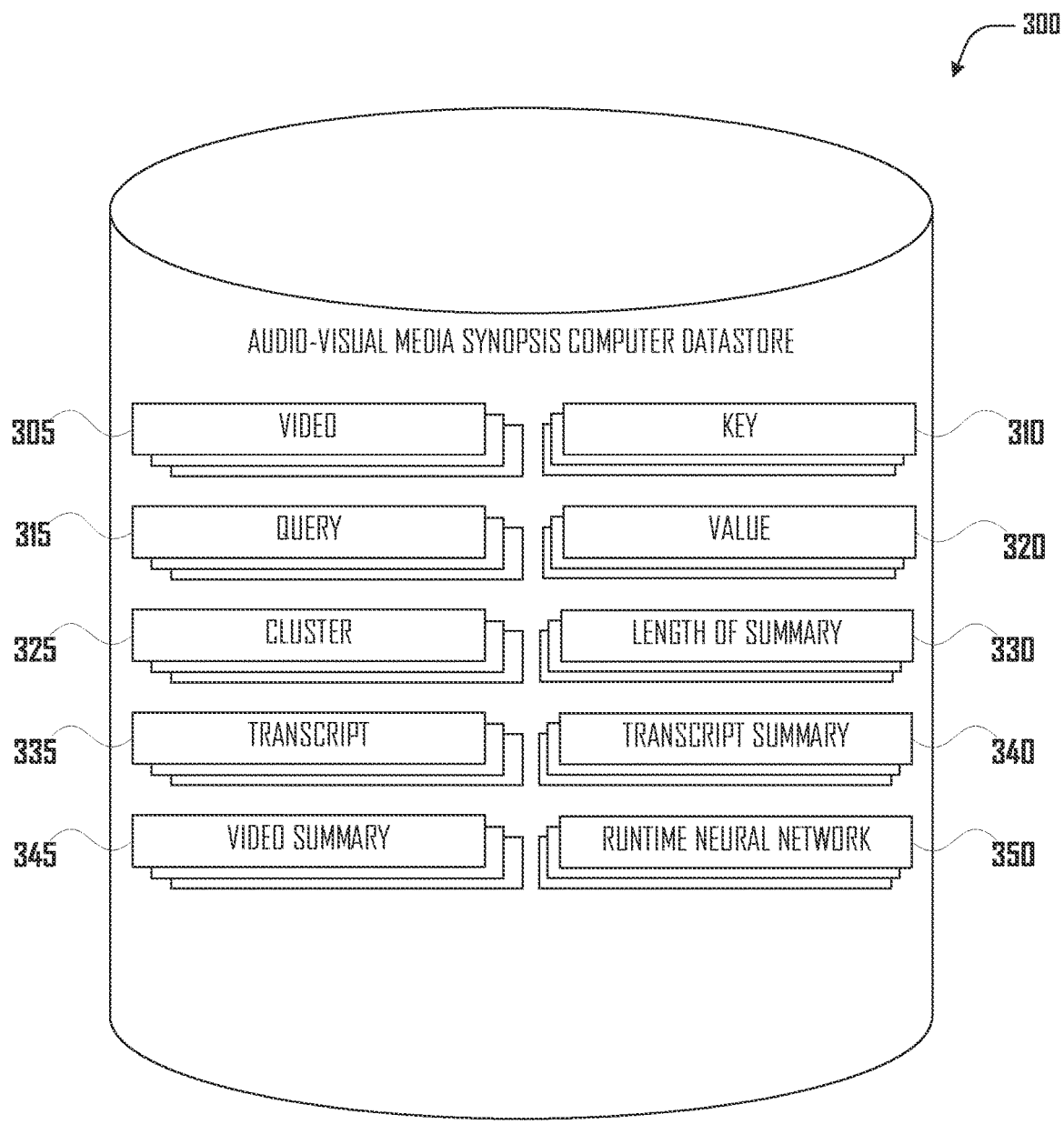
FIG. 3 is a functional block diagram illustrating an example of an audio-visual media synopsis computer device datastore incorporated with teachings of the present disclosure, consistent with embodiments of the present disclosure.

Computer device memory 250 is also illustrated as comprising kernel 285, kernel space 296, user space 290, user protected address space 260, and audio-visual media synopsis computer datastore 300 (illustrated and discussed further in relation to FIG. 3).

Computer device memory 250 may store one or more process 265 (i.e., executing software application(s)). Process 265 may be stored in user space 290. Process 265 may include one or more process 265A to 265N. One or more process 265 may execute generally in parallel, i.e., as a plurality of processes and/or a plurality of threads.

Computer device memory 250 is further illustrated as storing operating system 280 and/or kernel 285. Operating system 280 and/or kernel 285 may be stored in kernel space 296. In some embodiments, operating system 280 may include kernel 285. Operating system 280 and/or kernel 285 may attempt to protect kernel space 296 and prevent access by certain of process 265A . . . 265N.

Kernel 285 may be configured to provide an interface between user processes and circuitry associated with audio-visual media synopsis computer 200. In other words, kernel 285 may be configured to manage access to processor 215, chipset 255, I/O ports and peripheral devices by process 265. Kernel 285 may include one or more drivers configured to manage and/or communicate with elements of audio-visual media synopsis computer 200 (i.e., processor 215, chipset 255, I/O ports and peripheral devices).

Audio-visual media synopsis computer 200 may also comprise or communicate via bus 220 and/or network interface 230 with audio-visual media synopsis computer datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. Audio-visual media synopsis computer 200 may, in some embodiments, include many more components than as illustrated. However, it is not necessary that all components be shown in order to disclose an illustrative embodiment.

FIG. 3 is a functional block diagram of audio-visual media synopsis computer datastore 300 illustrated in the computer device of FIG. 2, according to some embodiments. The components of audio-visual media synopsis computer datastore 300 may include data groups used by modules and/or routines, e.g., video 305, key 310, query 315, value 320, cluster 325, length of summary 330, transcript 335, transcript summary 340, video summary 345, and runtime neural network 350 (one or more of which may be described more fully below). Embodiments may include additional data groups. The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of computer datastore 300 are discussed further herein in discussion of other of the Figures.

Figure 4:
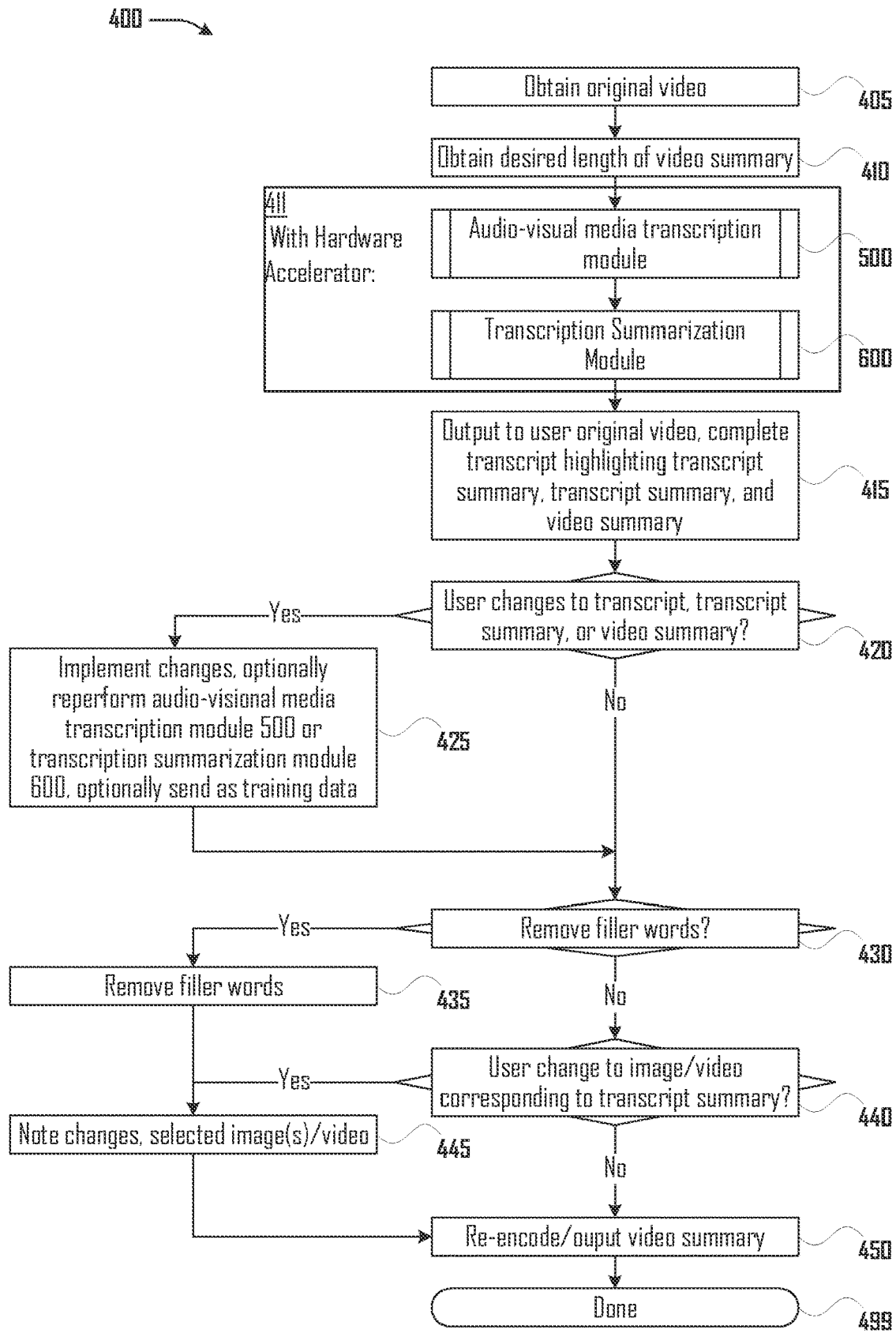
FIG. 4 is a flow diagram illustrating an example of a method performed by an audio-visual media synopsis module, according to some embodiments.

FIG. 4 is a flow diagram illustrating an example of audio-visual media synopsis module 400, according to an embodiment. Audio-visual media synopsis module 400 may be performed by audio-visual media synopsis computer device(s), such as audio-visual media synopsis computer 200, according to some embodiments. These modules may be performed by or with assistance of a hardware accelerator, such as hardware acceleration module 210.

At block 405, audio-visual media synopsis module 400 may obtain an original video or audio-visual media file, such as a video captured by recording device 105 and recording module 110. The original video may be provided to or by an individual, such as a user of recording device 105 or audio-visual media synopsis computer 200. The original video may be stored as, for example, one or more video 305 records. The obtained original video or audio-visual media file may be referred to herein as "video 305" or as audio-visual media.

At block 410, audio-visual media synopsis module 400 may obtain a desired length of a video summary. The desired length of the video summary may be obtained, for example, from a user, from a viewer of videos, such as from a user of viewer device 115, from another process, or the like. The desired length may be expressed in a number of seconds or minutes or in a percentage of video 305 (e.g. "5%" or "10%"). Conversion between such units may be performed by audio-visual media synopsis module 400.

At block 411, audio-visual media synopsis module 400 may call or perform blocks 500 and 600 using, for example, hardware acceleration module 210.

At block 500, audio-visual media synopsis module 400 may call or trigger execution of, for example, audio-visual media transcription module 500. Audio-visual media transcription module 500 may, for example, prepare a transcript of video 305 using a neural network in, for example, a transformer based machine learning artificial intelligence architecture.

Audio-visual media transcription module 500 may output a transcript based on audio in an audio track of video 305 and or based on lip, mouth, and or body language of a video track of video 305. If video 305 is provided with a transcript, such provided transcript may be used, instead of or to check the transcript produced by audio-visual media transcription module 500. The output transcript of audio-visual media transcription module 500 may be saved as one or more transcript 335 records. A neural network of audio-visual media transcription module 500 may be tained on a training data set comprising audio-visual media annotated with text and punctuation corresponding to text and punctuation in the audio-visual media.

Transcript 335 output by audio-visual media transcription module 500 may be processed by subsequent modules, such as transcription summarization module 600, to prepare a summary of transcript 335, which may be saved as one or more transcript summary 340 record.

At block 600, audio-visual media synopsis module 400 may call or trigger execution of, for example, transcription summarization module 600. Transcription summarization module 600 may, for example, identify meaning clusters in sentences in input transcript 335 and input video 305 records, referred to herein as "sentence meaning clusters", wherein meaning within each sentence meaning cluster is similar and is dissimilar between sentence meaning clusters. Identification of sentence meaning clusters may be performed by one or more neural networks in transcription neural network. The one or more neural networks in transcription neural network may comprise an unsupervised neural network and a supervised neural network. The unsupervised neural network may identify sentence meaning clusters based on word embeddings or term frequency-inverse document frequency ("TF-IDF") encoding. Sentence meaning clusters may also be understood as "topics". The supervised neural network may be trained on a training dataset training dataset comprising a plurality of audio-visual media files and or the transcript, wherein the plurality of audio-visual media and the transcript are annotated with a human feedback regarding summary status and not summary status. The human feedback regarding summary status and not summary status may be obtained from, for example, one or more humans watching audio-visual media and or from an audio-visual media playback application, wherein the audio-visual media playback application obtains the feedback from audience members viewing audio-visual media using the audio-visual media playback application. The feedback from the audience members may comprise, for example, a selection, an upvote, a downvote, a like, a clap, a thumbs up, a heart, a cry, a wow, an anger, a laughter, or a comment. A number of such sentence meaning clusters may be determined based on a desired length of a summary, such as from block 410. Transcription summarization module 600 may further select a number of sentences from each cluster, such as one sentence, a highest ranking sentence, a highest ranking sentence which is most dissimilar from sentences in other sentence meaning clusters, or the like. Transcription summarization module 600 may output a transcript summary, wherein the transcript summary may be stored as, for example, one or more transcript summary 340 records and a video summary, wherein the video summary may be stored as, for example, one or more video summary 345 records.

At block 415, audio-visual media synopsis module 400 may output or render to the user, such as to user interface 900, video 305, transcript 335, and video summary 345 along with, for example, highlights or other identification of portions of transcript 335 which contain or correspond to transcript summary 340 and video summary 345. The output may further highlight or identify other portions of transcript 335, such as filler words, such as "uh", and the like.

At decision block 420, audio-visual media synopsis module 400 may determine whether user input or feedback has been received indicating a change to transcript 335, transcript summary 340, or video summary 345. The user feedback may comprise an instruction to include or not include a portion of transcript 335, transcript summary 340, or a portion of video 305 or video summary in (a potentially re-rendered) video summary 345.

If affirmative or equivalent at decision block 420, at block 425 audio-visual media synopsis module 400 may implement the changes, such as by excluding or including selected portions in transcript summary 340 and or video summary 345, and or may re-perform audio-visual media transcription module 500 and or transcription summary module 600, with or without the included or excluded portions, and or may send the changes as training data to train or re-train audio-visual media transcription module 500 and or transcription summarization module 600 and neural networks therein.

Following block 425 or following a negative or equivalent decision at decision block 420, at decision block 430, audio-visual media synopsis module 400 may determine whether the user or another process indicates that filler words should be removed. If affirmative or equivalent at decision block 430, at block 435, audio-visual media synopsis module 400 may remove filler words and or corresponding audio-visual media from one or more of transcript 335, transcript summary 340, video 305, and or video summary 345.

Following block 435 and or following a negative or equivalent decision at decision block 430, at decision block 440, audio-visual media synopsis module 400 may determine whether a user change to an image or to a video (generally herein, references to "image" or to "video" should be understood to be equivalent) corresponding to a portion of a transcript summary 340 is received. For example, audio-visual media synopsis module 400 may offer images or video which may be substituted for a portion of a video track. The offered images or video may be provided by an artificial intelligence module, wherein the artificial intelligence module may obtain a meaning or sentiment of a portion of a transcript or of a portion of a video track and may identify other images or video associated with the meaning or sentiment and may offer such other images or video to be used as a substitute for the portion of the video track. Such offered substitute may be accepted by a user and or the user may provide a substitute image or video.

If affirmative or equivalent at decision block 440, at block 445, audio-visual media synopsis module 400 may implement selected images or video to be included or substituted into video summary 345.

Following block 445 and or following a negative or equivalent decision at decision block 440, at block 450, audio-visual media synopsis module 400 may re-encode and or output video summary 345. Video summary 345 may comprise, for example, portions of video 305 corresponding to transcript summary 340. Transcript summary 340 may comprise a number of sentences selected by audio-visual media synopsis module 400, wherein the number of sentences is based on a number of meaning clusters in sentences in transcript 335, wherein the number of meaning clusters is based on a desired length of video summary 345.

At block 499, audio-visual media synopsis module 400 may conclude and or return to a module and or another process which may have called it.

Figure 5:
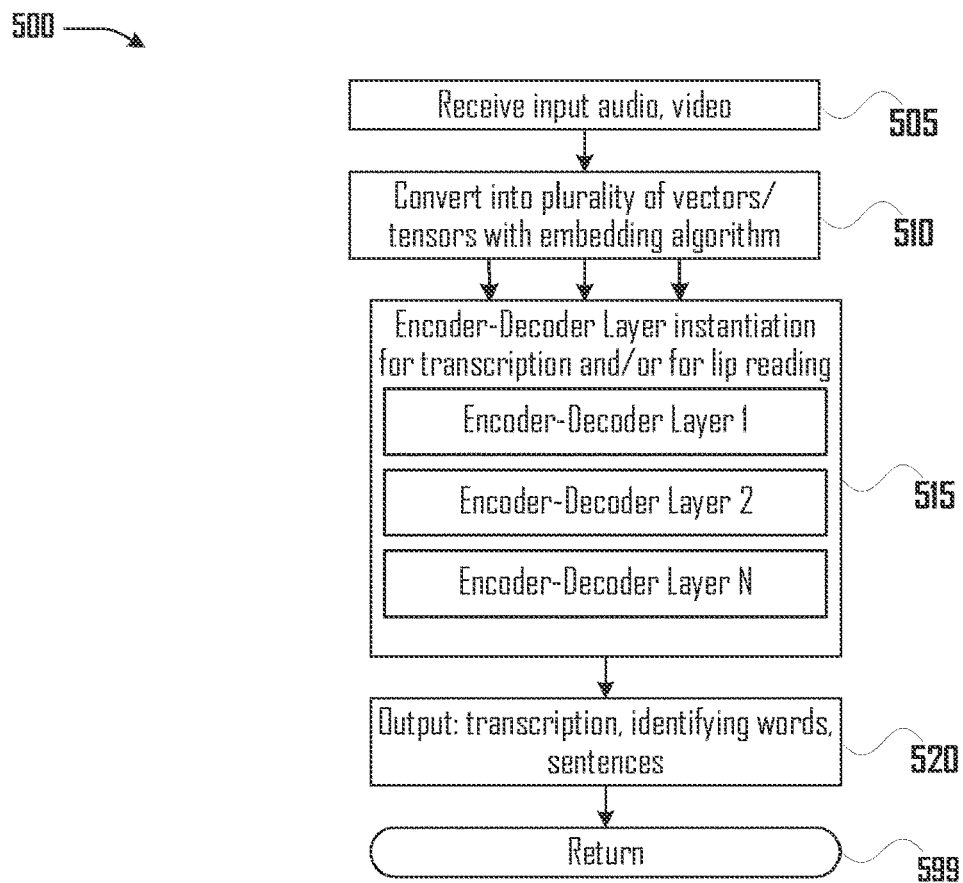
FIG. 5 is a flow diagram illustrating an example of a method performed by a audio-visual media transcription module, according to some embodiments.

FIG. 5 is a flow diagram illustrating an example of a method performed by audio-visual media transcription module 500, according to an embodiment. Audio-visual media transcription module 500 may be performed by audio-visual media synopsis computer device(s), such as audio-visual media synopsis computer 200, according to some embodiments. These modules may be performed by or with assistance of a hardware accelerator, such as hardware acceleration module 210.

At block 505, audio-visual media transcription module 500 may receive an input audio and or video, such as video 305 and or an audio track and or video track therein.

At block 510, audio-visual media transcription module 500 may convert the input audio and or video into a mel-spectrogram, representing how humans hear sounds. At block 510, audio-visual media transcription module 500 may further convert the input audio and or video and or mel-spectrogram thereof into plurality of vectors or tensors, because, for example, subsequent modules may process vectors or tensors. The vectors or tensors may encode the presence of low-level features, such as phonemes, audio signal level, the presence of an edge, of a color, of a mouth, of a mouth shape, etc., in pixels and the like. The vectors or tensors may also encode position or temporal information, so that low-level feature information is retained along with position or temporal information. Output of block 510 may comprise a plurality of feature channels, each of which is a tensor which encodes low-level feature information (such as the presence of phoneme, audio signal level, an edge, of a color, a mouth, etc., in pixels, and the like).

In block 515, audio-visual media transcription module 500 may create or instantiate a plurality of transformer encoder and or decoder layers to process feature channels. The layers may also be referred to herein as neurons or as a neural network and, for this module, as a transcription neural network. Audio-visual media transcription module 500 may load the encoder-decoder layers with filters, e.g. key 310, query 315, and value 320 records, determined, for example, when feedforward neural networks were trained on recognition tasks, such as conversion of an audio track into a transcript and or of conversion of video into a transcript based on lip reading. Output of the first layer is fed to the next layer, etc., until the layers are completed. The plurality of encoder-decoder layers may be created by calling encoder-decoder modules for each layer. Fewer or greater number of encoder-decoder layers may be used.

At block 520 audio-visual media transcription module 500 may output a text transcript. The text transcript may comprise words and punctuation, wherein the punctuation may organize the words into, for example, sentences. The transcript may be stored as one or more transcript 335 records.

At done or return block 599, audio-visual media transcription module 500 may conclude or return to a module or another process which may have called it.

Figure 6:
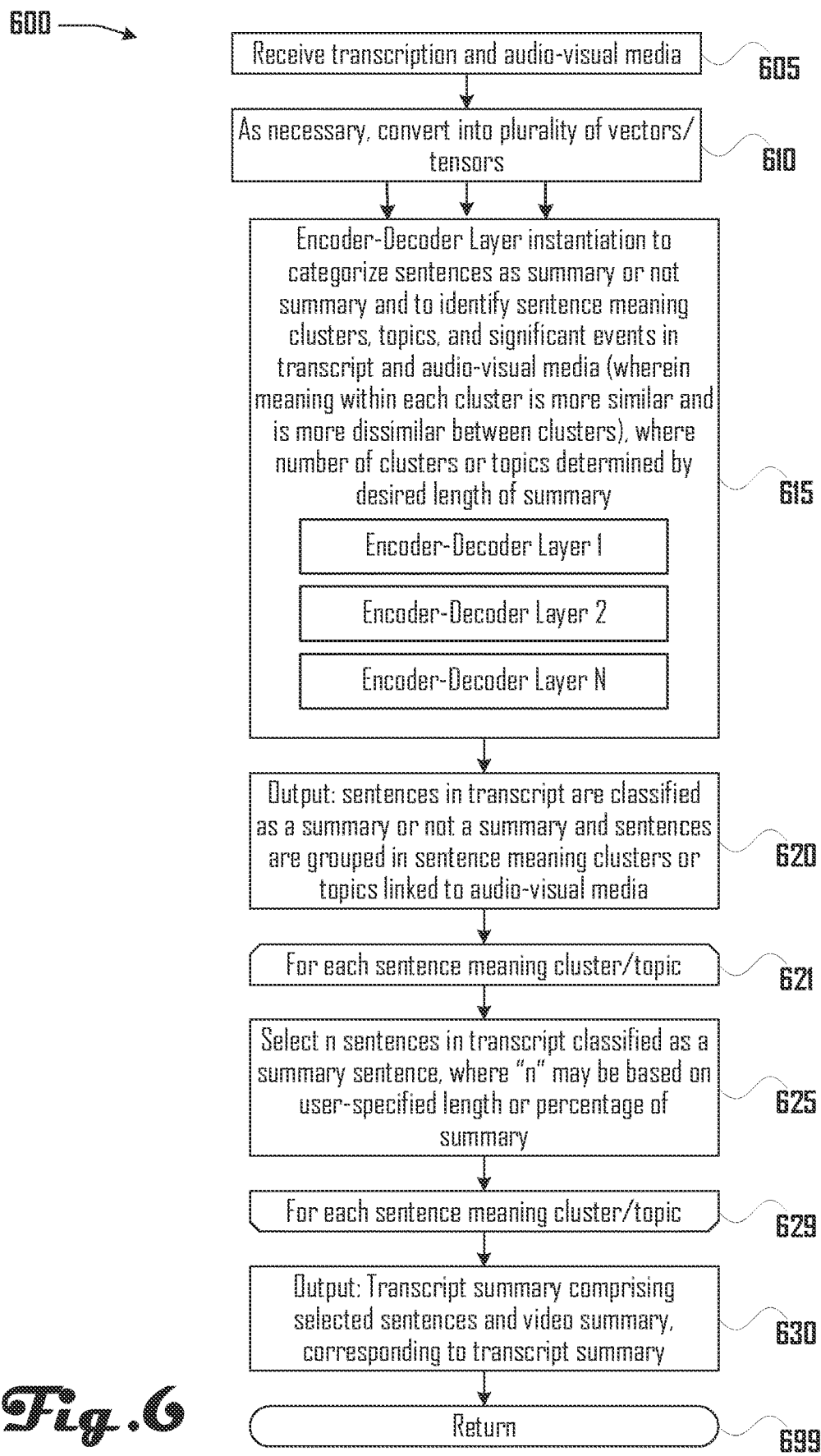
FIG. 6 is a flow diagram illustrating an example of a method performed by a transcription summarization module, according to some embodiments.

FIG. 6 is a flow diagram illustrating an example of a method performed by transcription summarization module 600, according to an embodiment. Transcription summarization module 600 may be performed by audio-visual media synopsis computer device(s), such as audio-visual media synopsis computer 200, according to some embodiments. These modules may be performed by or with assistance of a hardware accelerator, such as hardware acceleration module 210.

At block 605, transcription summarization module 600 may receive an input transcription, such as from audio-visual media transcription module 500, such as transcript 335, as well as an input audio-visual media, such as video 305.

At block 610, as necessary, transcription summarization module 600 may convert transcript 335 and video 305 into plurality of vectors or tensors, because, for example, subsequent modules may process vectors or tensors. This may not be necessary with respect to transcript 335 and or video 305, if, for example, vector or tensors of audio-visual media transcription module 500 are captured before transformation from vectors or tensors into transcript 335. The vectors or tensors may encode the presence of low-level features, such as words and or sentences, phonemes, audio signal level, the presence of an edge, of a color, of a mouth, of a mouth shape, etc., in pixels and the like. The vectors or tensors may also encode position or temporal information, so that low-level feature information is retained along with position or temporal information. Output of block 510 may comprise a plurality of feature channels, each of which is a tensor which encodes low-level feature information (such as the presence of phoneme, audio signal level, an edge, of a color, a mouth, etc., in pixels, and the like). The vectors or tensors may also encode position or temporal information, so that low-level feature information is retained along with position or temporal information. Output of block 610 may comprise a plurality of feature channels, each of which is a tensor which encodes low-level feature information (such as the presence of a word, a sentence, etc.).

In block 615, transcription summarization module 600 may create or instantiate a plurality of transformer encoder and or decoder layers to process feature channels. The layers may also be referred to herein as neurons or as one or more neural networks and, for this module, together, as a summarization neural network. The summarization neural network may comprise both unsupervised neural network layers and supervised neural network layers. The unsupervised neural network layers may be a term frequency-inverse document frequency ("TF-IDF") encoding neural network and the supervised network may be a summarization-trained neural network, wherein a training dataset for the supervised network comprises at least one of a plurality of audio-visual media and the transcript, wherein at least one of the plurality of audio-visual media and the transcript are annotated with a human feedback regarding summary status and not summary status, wherein the human feedback is obtained from an audio-visual media playback application, wherein the audio-visual media playback application obtains the feedback from audience members, wherein the human feedback comprises at least one of an upvote, a downvote, a like, a clap, a thumbs up, a heart, a cry, a wow, an anger, a laughter, a comment, or the like.

Transcription summarization module 600 may load the encoder-decoder layers with filters, e.g. key 310, query 315, and value 320 records, determined when supervised neural networks were trained on recognition tasks, such as identification of summary or not summary status or determined when the unsupervised neural network determines frequency-inverse document frequency ("TF-IDF") encodings. Output of the first layer is fed to the next layer, etc., until the layers are completed. The plurality of encoder-decoder layers may be created by calling encoder-decoder modules for each layer. Fewer or greater number of encoder-decoder layers may be used.

Processing of the input vectors or tensors derived from the input transcript 335 as well as the input video 305 with the summarization neural network and its supervised and unsupervised neural network layers results in determination of sentence meaning clusters in the transcript through a process (performed by the summarization neural network) which may be informed both by the text of transcript 335 as well as by audio and or visual cues in video 305. For example, the unsupervised neural network in the summarization neural network may focus on and process the text of transcript 335 and identify sentence meaning clusters and associations with summary and not summary status influenced by word embeddings, such as TF-IDF encodings, relative to the text while the supervised neural network in the summarization neural network may focus on and process the audio and video of video 305 and identify sentence meaning clusters and associations with summary and not summary status (provided in the annotated training data) influenced by audio and visual cues, such as louder voices, gestures, changes in a slide deck, repetition of or return to graphical components of a slide deck or presentation, or the like. These are neural networks, which operate something like a "black box", so it cannot be said precisely how the neural network layers within the summarization neural network work together to correlate the input transcript 335 and video 305 with summary and not summary static and to form the resulting sentence meaning clusters, though acceptable performance of the summarization neural network in producing sentence meaning clusters or topics based on the input transcript 335 and video 305 is determined by neural network training module 700.

At block 620, transcription summarization module 600 may output sentence meaning clusters. Semantic meaning of sentences within each cluster may be similar; semantic meaning of sentences between clusters may be different. A number of sentence meaning clusters may be determined according to a desired length of a transcript summary. In embodiments, ranking may not be cluster oriented, but may, for example, be based on text-rank and/or on text-rank including a component of document frequency, including inverse document frequency. Sentences in the sentence meaning clusters may be linked to corresponding portions of video 305.

Opening loop block 621 to closing loop block 629 may iterate over the sentence meaning clusters or topics.

For each sentence meaning cluster or topic, at block 625, transcription summarization module 600 may select a number of sentences from each cluster, for example, one or more sentences from each sentence meaning cluster. The selected sentence may be a highest ranking sentence in a cluster, a highest ranking sentence which is most dissimilar from sentences in other clusters, a fixed number, a number to achieve a percentage of video 305, and the like.

Closing loop block 629 may return to opening loop block 621 to iterate over sentence meanding clusters or topics until all of them are processed.

At block 630, transcription summarization module 600 may output transcript summary 340 comprising, for example, sentences selected at block 625 as well as video summary 345, wherein video summary comprises portions of video 305 corresponding to transcript summary 340. In this way, transcription summarization module 600 prepares transcript summary 340 and video summary 345 as extractive summaries, comprising quotes or portions of video 305 extracted from video 305, rather than an abstractive or paraphrased summary (which may re-state text in alternative words).

At done or return block 699, transcription summarization module 600 may conclude or return to a module or another process which may have called it.

Figure 7:
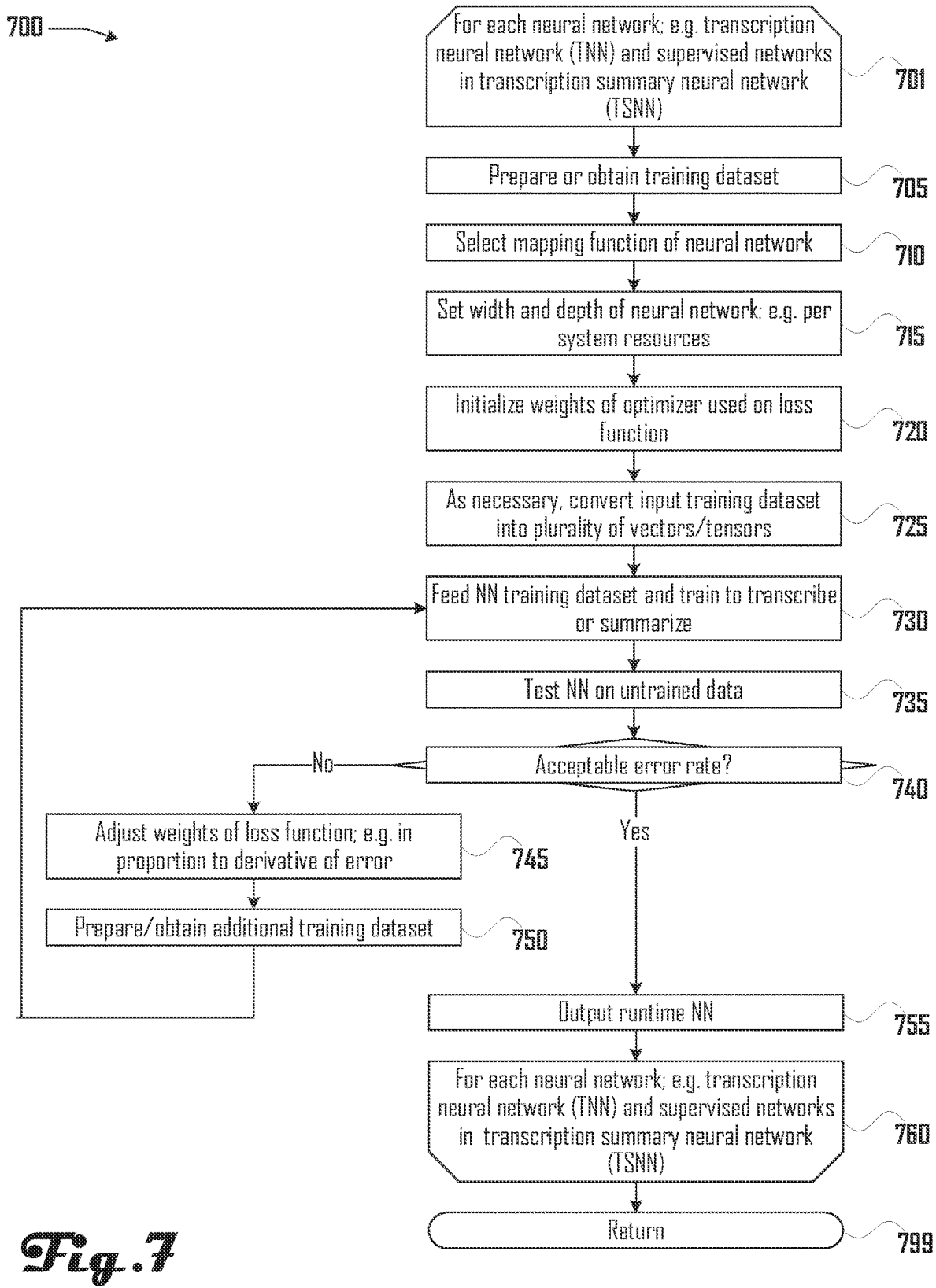
FIG. 7 is a flow diagram illustrating an example of a method performed by a neural network training module, according to some embodiments.

FIG. 7 is a flow diagram illustrating an example of a method performed by neural network training module 700, incorporated with teachings of the present disclosure, according to some embodiments. Neural network training module 700 may be performed by audio-visual media synopsis computer device(s), such as audio-visual media synopsis computer 200, according to some embodiments. These modules may be performed by or with assistance of a hardware accelerator, such as hardware acceleration module 210.

Opening loop block 701 to closing loop block 760 may iterate over neural networks to be trained, e.g. transcription neural network (TNN) and or supervised neural networks in transcription summary neural network (TSNN).

At block 705, neural network training module 700 may obtain a training dataset for the then-current neural network. For the TNN, the training dataset may comprise audio files and or video files (audio-visual media files). The audio-visual media files may be annotated with text corresponding to that which is spoken, signed, or the like in the audio-visual media files. The annotated audio-visual media files may cover a broad cross-section of vocabulary and or may comprise vocabulary specific to an activity, category of organization, industry, or the like. Multiple TNN may be trained, to be used with respect to vocabulary and syntax used by different communities. For the TSNN, the training dataset for a supervised neural network therein may comprise text and punctuation for a plurality of audio-visual media (transcripts of the audio-visual media) and the plurality of audio-visual media, annotated with a human feedback regarding summary status and not summary status. The human feedback may obtained from an audio-visual media playback application, wherein the audio-visual media playback application obtains the feedback from audience members, wherein the human feedback comprises, for example, at least one of an upvote, a downvote, a like, an emoji, a clap, a thumbs up, a heart, a cry, a wow, an anger, a laughter, a comment, or the like. An unsupervised neural network in the TSNN may determine a word embedding or term frequency-inverse document frequency ("TF-IDF") encoding, for text across a large corpus of documents. The TF-IDF value increases proportionally to the number of times a word occurs in a specific document and is offset by the number of documents in the corpus of documents which contain the word. The TF-IDF value can identify "filler" words, such as "a" or "the" and can be used to identify word combinations in a "document" (which may be a transcript of an audio-visual media file) which are emblematic for the document.

At block 710, neural network training module 700 may select mapping function(s) of the then-current neural network.

At block 715, neural network training module 700 may scale the then-current neural network, wherein the scale may comprise depth, width, and resolution. Depth may comprise, for example, a number of layers in the neural network. Width may comprise, for example, a number of channels in each layer in the neural network. Resolution may comprise, for example, the resolution of audio or images passed to the neural network. Width, for example, may be set based on computer resources, such as resources in audio-visual media synopsis computer 200 and or viewer device 115 (if viewer device is to be used as an execution environment for some or all of audio-visual media synopsis module 400).

At block 720, neural network training module 700 may initialize weights of an optimizer used on a loss function of the then-current neural network. The weights may be initialized at, for example, small random values.

At block 725, neural network training module 700 may convert the input training dataset of block 705 into a plurality of vectors and or tensors.

At block 730, neural network training module 700 may provide the then-current neural network with a portion of the training dataset of block 705.

At block 735, neural network training module 700 may test the then-current neural network on untrained training data, e.g. on a portion of the training dataset of block 705 not previously provided during training at block 725, to determine whether the then-current neural network is returning acceptable results.

At decision block 740, neural network training module 700 may determine whether the then-current neural network produces an acceptable error rate in performance of the objective of the neural network. For example, the objective of the TNN may be to transcribe audio-visual media files; for example, the objective of the TSNN may be to identify summary and not summary sentences and to group input sentences into sentence meaning clusters. An acceptable error rate may be, for example, less than five or ten percent.

If negative or equivalent at decision block 740, at block 745, neural network training module 700 may adjust weights of the optimizer used on the loss function. Adjustment of weights may be, for example, in proportion to a derivative of error. If necessary or desirable, the scale of the then-current neural network may also be adjusted.

At block 750, neural network training module 700 may prepare or obtain additional training set data and may then return to block 730.

At block 755, which may follow decision block 740 following an affirmative or equivalent decision, neural network training module 700 may output a runtime neural network, such as a runtime TNN or runtime TSNN. The output neural network may be stored as, for example, one or more runtime neural network 350 records.

At closing loop block 760, neural network training module 700 may return to opening loop block 701 to iterate over another neural network to train, if any.

At block 799, neural network training module 700 may conclude and/or return to a module and/or another process which may have called it.

Figure 8:
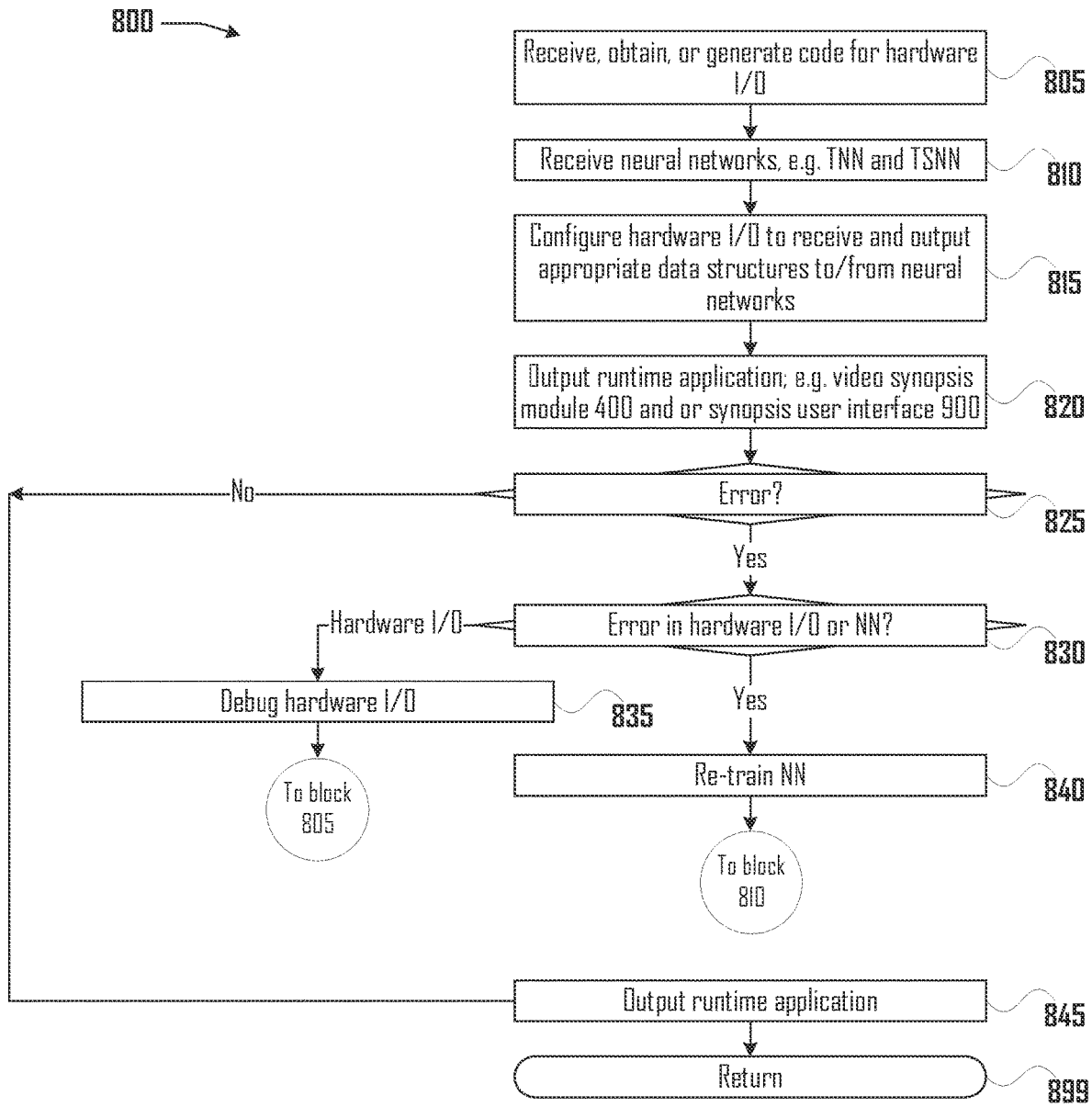
FIG. 8 is a flow diagram illustrating an example of a method performed by a synopsis application generation module, according to some embodiments.

FIG. 8 is a flow diagram illustrating an example of a method performed by synopsis application generation module 800, incorporated with teachings of the present disclosure, according to some embodiments. Synopsis application generation module 800 may be performed by audio-visual media synopsis computer device(s), such as audio-visual media synopsis computer 200, according to some embodiments. These modules may be performed by or with assistance of a hardware accelerator, such as hardware acceleration module 210.

At block 805, synopsis application generation module 800 may receive, obtain, or generate code for hardware interface or input/output. The hardware interface may allow hardware for audio-visual media synopsis computer 200 and modules thereof, such as audio-visual media synopsis module 400, to interface with one or more humans, to interface with other processes, and to interface with hardware input and output devices, such as through synopsis user interface 900 (discussed further herein).

The hardware interface may be with respect to human-computer interface, such as a tablet computer, a laptop, or the like; the hardware interface for the human-computer interface may comprise audio, visual, keyboard, and tactile input by the human and output to the human. The hardware interface for the human-computer interface may further allow human input into synopsis user interface 900, audio-visual media synopsis module 400, and the like.

At block 810, synopsis application generation module 800 may obtain or receive runtime neural networks corresponding to runtime application being prepared. For example, if preparing audio-visual media synopsis module 400 and submodules thereof, such as audio-visual media transcription module 500 and or transcription summarization module 600, synopsis application generation module 800 may obtain or receive runtime neural networks 350 corresponding to the TNN and TSNN.

At block 815, synopsis application generation module 800 may configure the hardware interface to receive and output appropriate data structure(s) with respect to the hardware execution computer system environment and to and from the neural networks.

At block 820, synopsis application generation module 800 may output the runtime application, such as audio-visual media synopsis module 400 and or synopsis user interface 900.

At decision block 825, synopsis application generation module 800 may test the runtime application and determine whether an error has occurred.

If affirmative or equivalent at decision block 825, at decision block 830, synopsis application generation module 800 may determine whether the error was an error in the hardware I/O or in the neural network.

If in the hardware I/O or equivalent at decision block 830, then at block 835 synopsis application generation module 800 may debug or have the hardware I/O debugged. Following block 835, synopsis application generation module 800 may return to block 805.

If in the neural network or equivalent at decision block 830, then at block 840 synopsis application generation module 800 may retrain the neural network, such as by calling neural network training module 700. Following block 840, synopsis application generation module 800 may return to block 810.

If negative or equivalent at decision block 825, synopsis application generation module 800 may output the then-current runtime application, such as audio-visual media synopsis module 400, synopsis user interface 900, or submodules thereof. In embodiments, synopsis application generation module 800 may output the runtime application with the neural network as a separate module, which may be updated or upgraded separately from the runtime application.

At block 899, synopsis application generation module 800 may conclude and/or return to a module and/or another process which may have called it.

Figure 9:
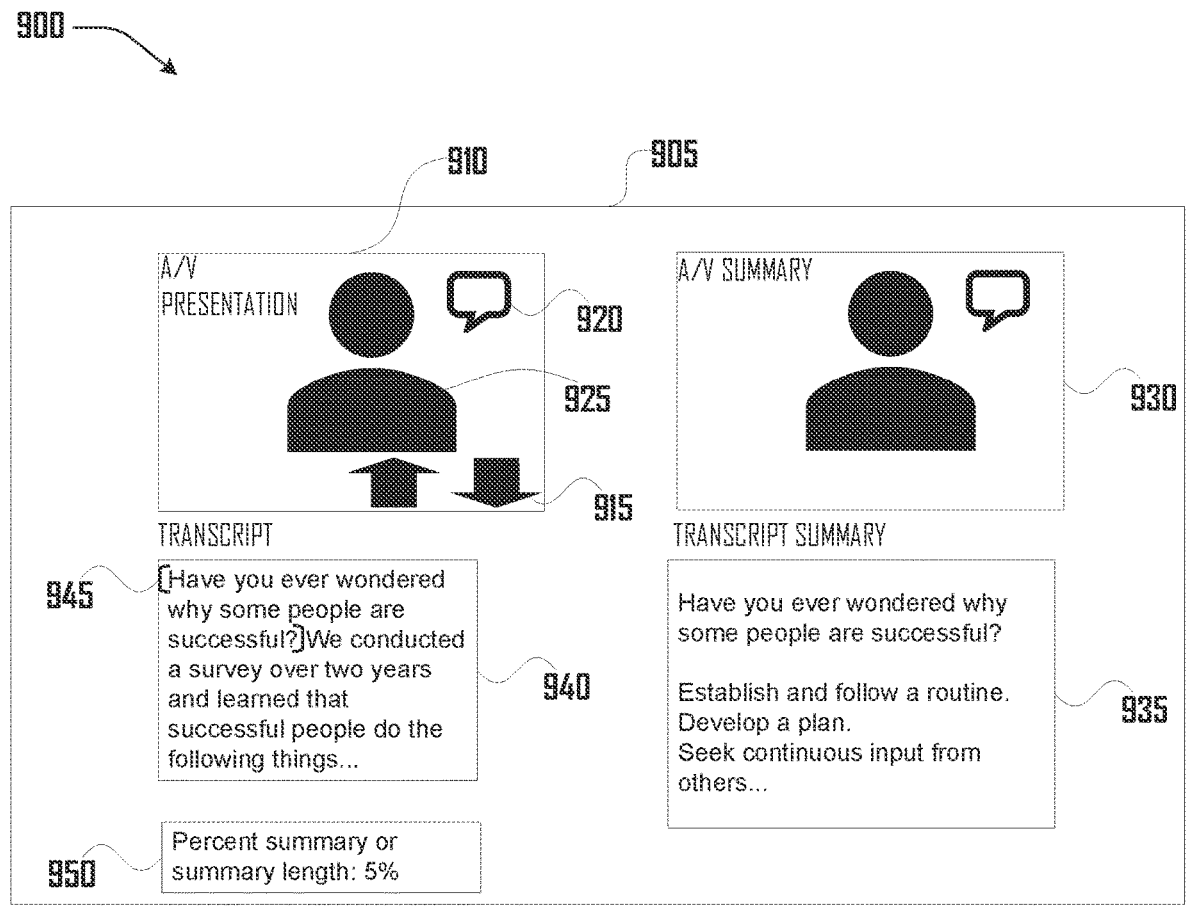
FIG. 9 is an illustration of an example of a synopsis user interface, according to some embodiments.

FIG. 9 is an illustration of an example of synopsis user interface 900, according to some embodiments. Window 905 may be a window or display pane in a graphical user interface of a computer, such as in viewer device 115 and or audio-visual media synopsis computer 200. Window 905 is illustrated as one window, though may be one or more windows.

Within window 905 may be a full-length audio-visual media presentation window 910, in which a full-length or original audio-visual media file, e.g. video 335, may be rendered. Within full-length audio-visual media presentation window 910 may be a rendered content which may comprise, for example, presenter 925 and audio 920 from or associated with presenter 925. Full-length audio-visual media presentation window 910 may provide a user with opportunity to provide feedback 915 regarding rendered content within full-length audio-visual media presentation window 910. Opportunities to provide feedback may comprise, for example, an upvote, a downvote, a like, a clap, a thumbs up, an emoji, a heart, a cry, a wow, an anger, a laughter, or a text or audio comment, or the like.

Within window 905 may be transcript window 940, in which a transcript, e.g. transcript 335, of the full-length or original audio-visual media file rendered in window 910. The transcript may be prepared by, for example, audio-visual media synopsis module 400 and subroutines thereof, such as audio-visual media transcription module 500, as discussed herein. Transcript window 940 may itself or may allow a user to highlight or select portions of the transcript, such as portion 945 within brackets. Transcript window 940 may highlight or select portions of the transcript, such as portion 945 within brackets, which portions are to appear in the transcript summary. The user may highlight or select portions of the transcript to have them included or excluded from, for example, a transcript summary.

Not illustrated, full-length audio-visual media presentation window 910 may comprise a string of thumbnail images, or the like, of the full-length or original audio-visual media file rendered in window 910. Such a string of thumbnails or the like may be used by a user to select portions of the full-length or original audio-visual media file rendered in window 910 to be include or excluded from the transcript and or transcript summary.

Within window 905 may be video summary window 930, in which a video summary, e.g. video summary 345, may be presented. The video summary may be prepared by, for example, audio-visual media synopsis module 400 and subroutines thereof, such as transcription summarization module 600, as discussed herein.

Within window 905 may be transcript summary window 935, in which a transcript summary may be presented. The transcript summary may be prepared by, for example, audio-visual media synopsis module 400 and subroutines thereof, such as transcription summarization module 600, as discussed herein. Transcript summary window 935 may allow a user to highlight or select portions of the transcript summary. The user may highlight or select portions of the transcript summary to have them included or excluded from, for example, a re-encoding of the transcript summary or the video summary in video summary window 930. As noted, "Have you ever wondered why some people are successful" transcript summary window 935 is a quote from the transcript in transcript window 940. Additional portions of transcript summary, e.g. "Establish and follow a routine." Would also be quotes from the transcript (not then-rendered in transcript window 940, but which occur later).

Within window 905 may be summarization length selection window 950. Summarization length selection window 950 may allow a user to select a length of a transcript summary and or video summary. The length may be expressed, for example, as a number of units of time, as a percentage of the full-length or original audio-visual media file rendered in window 910, or the like.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limiting examples:

Example 1. An apparatus for summarizing an audio-visual media, comprising: a computer processor and a memory; and an audio-visual media synopsis module to summarize the audio-visual media, wherein to summarize the audio-visual media, the audio-visual media synopsis module is to obtain the audio-visual media, perform a transcription neural network to prepare a transcript of the audio-visual media, perform a summarization neural network to prepare a transcript summary of the transcript of the audio-visual media, and wherein the audio-visual media synopsis module is to output the transcript summary.

Example 2. The apparatus according to Example 1 and or another example herein, wherein the audio-visual media synopsis module is further to prepare and output a video summary of the audio-visual media, wherein the video summary of the audio-visual media comprises portions of the audio-visual media corresponding to the transcript summary.

Example 3. The apparatus according to Example 1 and or another example herein, further comprising providing the summarization neural network with the transcript and the audio-visual media and wherein to prepare the transcript summary, the summarization neural network is to identify a plurality of sentence meaning clusters in the transcript based on the transcript and the audio-visual media and wherein to prepare the transcript summary further comprises to select a number of sentences from the plurality of sentence meaning clusters.

Example 4. The apparatus according to Example 3, wherein providing the summarization neural network with the transcript and the audio-visual media comprises providing the summarization neural network with vectors and or tensors derived from the transcript and the audio-visual media.

Example 5. The apparatus according to Example 3 and or another example herein, wherein sentence meaning clusters are to be identified by the summarization neural network using at least one of on an unsupervised neural network and a supervised neural network.

Example 6. The apparatus according to Example 5 and or another example herein, wherein the unsupervised neural network is a term frequency-inverse document frequency encoding neural network and the supervised network is a summarization-trained neural network.

Example 7. The apparatus according to Example 6 and or another example herein, wherein a training dataset for the supervised network comprises at least one of a plurality of audio-visual media and the transcript.

Example 8. The apparatus according to Example 7 and or another example herein, wherein at least one of the plurality of audio-visual media and the transcript are annotated with a human feedback regarding summary status and not summary status.

Example 9. The apparatus according to Example 8 and or another example herein, wherein the human feedback is obtained from an audio-visual media playback application, wherein the audio-visual media playback application obtains the feedback from audience members.

Example 10. The apparatus according to Example 9 and or another example herein, wherein the human feedback comprises at least one of an upvote, a downvote, a like, an emoji, a clap, a thumbs up, a heart, a cry, a wow, an anger, a laughter, or a comment.

Example 11. The apparatus according to Example 3 and or another example herein, wherein a number of sentence meaning clusters in the plurality of sentence meaning clusters are identified based on a user-specified length of the video summary of the audio-visual media or a user-specified percentage of audio-visual media.

Example 12. The apparatus according to Example 3 and or another example herein, wherein to select the number of sentences from the plurality of sentence meaning clusters comprises to select a highest ranking sentence in a sentence meaning cluster, a highest ranking sentence which is most dissimilar from sentences in other sentence meaning clusters, or a number of sentences from each of the sentence meaning clusters.

Example 13. The apparatus according to Example 3 and or another example herein, wherein the summarization neural network is further to categorize sentences as summary sentences or not summary sentences and wherein the number of sentences selected from the plurality of sentence meaning clusters are sentences categorized as summary sentences.

Example 14. The apparatus according to Example 1 and or another example herein, wherein the transcript prepared by the transcription neural network comprises words and punctuation.

Example 15. The apparatus according to Example 1 and or another example herein, wherein the transcription neural network is trained on a training data set comprising audio-visual media annotated with text and punctuation corresponding to text, spoken words, and punctuation in the audio-visual media.

Example 16. The apparatus according to Example 1 and or another example herein, wherein the audio-visual media synopsis module is further to remove filler words from at least one of the transcript, the transcript summary, or the video summary.

Example 17. The apparatus according to Example 1 and or another example herein, wherein the audio-visual media synopsis module is further to obtain a user feedback regarding at least one of the audio-visual media, the transcript, the transcript summary, or the video summary.

Example 18. The apparatus according to Example 17 and or another example herein, wherein the user feedback comprises at least one of an instruction to include or exclude a portion of the audio-visual media from at least one of the transcript, the transcript summary, or the video summary, to include or exclude a portion of the transcript from at least one of the transcript summary or the video summary, or to exclude filler words from at least one of the transcript, the transcript summary, or the video summary.

Example 19. The apparatus according to Example 17 and or another example herein, wherein the audio-visual media synopsis module is further to retrain at least one of the transcription neural network or the summarization neural network based on the user change to at least one of the transcript, the transcript summary, or the video summary.

Example 20. The apparatus according to Example 1 and or another example herein, wherein at least one of the transcription neural network or the summarization neural network are part of a transformer architecture.

Example 21. The apparatus according to Example 1 and or another example herein, wherein at least one of the transcription neural network or the summarization neural network comprises a plurality of encoder-decoder layers.

Example 22. The apparatus according to Example 1 and or another example herein, wherein the audio-visual media synopsis module is further to convert the audio-visual media into a plurality of vectors or tensors and is to feed the transcription neural network the plurality of vectors or tensors.

Example 23. The apparatus according to Example 1, wherein the audio-visual media synopsis module is further to convert the transcript into a plurality of vectors or tensors and is to feed the summarization neural network the plurality of vectors or tensors.

Example 24. A computer implemented method for summarizing an audio-visual media, comprising: obtaining the audio-visual media, performing a transcription neural network to prepare a transcript of the audio-visual media, performing a summarization neural network to prepare a transcript summary of the transcript of the audio-visual media, and outputting the transcript summary.

Example 25. The method according to Example 24 and or another example herein, further comprising preparing and outputting a video summary of the audio-visual media, wherein the video summary of the audio-visual media comprises portions of the audio-visual media corresponding to the transcript summary.

Example 26. The method according to Example 24 and or another example herein, wherein performing the summarization neural network to prepare the transcript summary comprises providing the summarization neural network with the transcript and the audio-visual media, with the summarization neural network, identifying a plurality of sentence meaning clusters in the transcript based on the transcript and the audio-visual media and wherein to prepare the transcript summary further comprises selecting a number of sentences from the plurality of sentence meaning clusters.

Example 27. The method according to Example 26, wherein providing the summarization neural network with the transcript and the audio-visual media comprises providing the summarization neural network with vectors and or tensors derived from the transcript and the audio-visual media.

Example 28. The method according to Example 26 and or another example herein, wherein identifying sentence meaning clusters comprises providing the summarization neural network with the transcript and the audio-visual media and identifying sentence meaning clusters using at least one of on an unsupervised neural network and a supervised neural network of the summarization neural network.

Example 29. The method according to Example 28 and or another example herein, wherein the unsupervised neural network is a term frequency-inverse document frequency encoding neural network and the supervised network is a summarization-trained neural network.

Example 30. The method according to Example 29 and or another example herein, wherein a training dataset for the supervised network comprises at least one of a plurality of audio-visual media and the transcript.

Example 31. The method according to Example 30 and or another example herein, wherein at least one of the plurality of audio-visual media and the transcript are annotated with a human feedback regarding summary status and not summary status.

Example 32. The method according to Example 31 and or another example herein, further comprising obtaining the human feedback from an audio-visual media playback application, wherein the audio-visual media playback application obtains the feedback from audience members.

Example 33. The method according to Example 32 and or another example herein, wherein the human feedback comprises at least one of an upvote, a downvote, a like, an emoji, a clap, a thumbs up, a heart, a cry, a wow, an anger, a laughter, or a comment.

Example 34. The method according to Example 26 and or another example herein, further comprising selecting a number of sentence meaning clusters in the plurality of sentence meaning clusters based on a user-specified length of the video summary of the audio-visual media or a user-specified percentage of audio-visual media.

Example 35. The method according to Example 26 and or another example herein, wherein selecting the number of sentences from the plurality of sentence meaning clusters comprises selecting a highest ranking sentence in a sentence meaning cluster, a highest ranking sentence which is most dissimilar from sentences in other sentence meaning clusters, or a number of sentences from each of the sentence meaning clusters.

Example 36. The method according to Example 26 and or another example herein, further comprising categorizing sentences as summary sentences or not summary sentences with the summarization neural network and wherein selecting the number of sentences selected from the plurality of sentence meaning clusters are sentences categorized as summary sentences.

Example 37. The method according to Example 24 and or another example herein, further comprising preparing the transcript with the transcription neural network comprising words and punctuation.

Example 38. The method according to Example 24 and or another example herein, further comprising training the transcription neural network on a training data set comprising audio-visual media annotated with text and punctuation corresponding to text, spoken words, and punctuation in the audio-visual media.

Example 39. The method according to Example 24 and or another example herein, further comprising removing filler words from at least one of the transcript, the transcript summary, or the video summary.

Example 40. The method according to Example 24 and or another example herein, further comprising obtaining a user feedback regarding at least one of the audio-visual media, the transcript, the transcript summary, or the video summary.

Example 41. The method according to Example 40 and or another example herein, wherein the user feedback comprises at least one of an instruction to include or exclude a portion of the audio-visual media from at least one of the transcript, the transcript summary, or the video summary, to include or exclude a portion of the transcript from at least one of the transcript summary or the video summary, or to exclude filler words from at least one of the transcript, the transcript summary, or the video summary.

Example 42. The method according to Example 40 and or another example herein, further comprising retraining at least one of the transcription neural network or the summarization neural network based on the user change to at least one of the transcript, the transcript summary, or the video summary.

Example 43. The method according to Example 24 and or another example herein, wherein at least one of the transcription neural network or the summarization neural network are part of a transformer architecture.

Example 44. The method according to Example 24 and or another example herein, further comprising instantiating a plurality of encoder-decoder layers for at least one of the transcription neural network or the summarization neural network.

Example 45. The method according to Example 24 and or another example herein, further comprising converting the audio-visual media into a plurality of vectors or tensors and feeding at least one of the transcription neural network or the summarization neural network the plurality of vectors or tensors.

Example 46. The method according to Example 24, further comprising converting the transcript into a plurality of vectors or tensors and feeding the summarization neural network the plurality of vectors or tensors.

Example 47. A computer apparatus for summarizing an audio-visual media, comprising: means to obtain the audio-visual media, means to perform a transcription neural network to prepare a transcript of the audio-visual media, means to perform a summarization neural network to prepare a transcript of the audio-visual media, means to perform a summarization neural network to prepare a transcript summary of the transcript of the audio-visual media, and means to output the transcript summary.

Example 48. The computer apparatus according to Example 47 and or another example herein, further comprising means to prepare and output a video summary of the audio-visual media, wherein the video summary of the audio-visual media comprises portions of the audio-visual media corresponding to the transcript summary.

Example 49. The computer apparatus according to Example 47 and or another example herein, wherein means to perform the summarization neural network to prepare the transcript summary comprises means to provide the summarization neural network with the transcript and the audio-visual media, with the summarization neural network, means to identify a plurality of sentence meaning clusters in the transcript based on the transcript and the audio-visual media and wherein to prepare the transcript summary further comprises means to select a number of sentences from the plurality of sentence meaning clusters.

Example 50. The computer apparatus according to Example 49, wherein means to provide the summarization neural network with the transcript and the audio-visual media comprises means to provide the summarization neural network with vectors and or tensors derived from the transcript and the audio-visual media.

Example 51. The computer apparatus according to Example 49 and or another example herein, wherein means to identify sentence meaning clusters comprises means to provide the summarization neural network with the transcript and the audio-visual media and means to identify sentence meaning clusters using at least one of on an unsupervised neural network and a supervised neural network of the summarization neural network.

Example 52. The computer apparatus according to Example 51 and or another example herein, wherein the unsupervised neural network is a term frequency-inverse document frequency encoding neural network and the supervised network is a summarization-trained neural network.

Example 53. The computer apparatus according to Example 52 and or another example herein, wherein a training dataset for the supervised network comprises at least one of a plurality of audio-visual media and the transcript.

Example 54. The computer apparatus according to Example 53 and or another example herein, wherein at least one of the plurality of audio-visual media and the transcript are annotated with a human feedback regarding summary status and not summary status.

Example 55. The computer apparatus according to Example 54 and or another example herein, further comprising means to obtain the human feedback from an audio-visual media playback application, wherein the audio-visual media playback application obtains the feedback from audience members.

Example 56. The computer apparatus according to Example 55 and or another example herein, wherein the human feedback comprises at least one of an upvote, a downvote, a like, an emoji, a clap, a thumbs up, a heart, a cry, a wow, an anger, a laughter, or a comment.

Example 57. The computer apparatus according to Example 49 and or another example herein, further comprising means to select a number of sentence meaning clusters in the plurality of sentence meaning clusters based on a user-specified length of the video summary of the audio-visual media or a user-specified percentage of audio-visual media.

Example 58. The computer apparatus according to Example 49 and or another example herein, wherein means to select the number of sentences from the plurality of sentence meaning clusters comprises means to select a highest ranking sentence in a sentence meaning cluster, a highest ranking sentence which is most dissimilar from sentences in other sentence meaning clusters, or a number of sentences from each of the sentence meaning clusters.

Example 59. The computer apparatus according to Example 49 and or another example herein, further comprising means to categorize sentences as summary sentences or not summary sentences with the summarization neural network and wherein the number of sentences selected from the plurality of sentence meaning clusters are sentences categorized as summary sentences.

Example 60. The computer apparatus according to Example 47 and or another example herein, further comprising means to prepare the transcript comprising words and punctuation with the transcription neural network.

Example 61. The computer apparatus according to Example 47 and or another example herein, further comprising means to train the transcription neural network on a training data set comprising audio-visual media annotated with text and punctuation corresponding to text, spoken words, and punctuation in the audio-visual media.

Example 62. The computer apparatus according to Example 47 and or another example herein, further comprising means to remove filler words from at least one of the transcript, the transcript summary, or the video summary.

Example 63. The computer apparatus according to Example 47 and or another example herein, further comprising means to obtain a user feedback regarding at least one of the audio-visual media, the transcript, the transcript summary, or the video summary.

Example 64. The computer apparatus according to Example 63 and or another example herein, wherein the user feedback comprises at least one of an instruction to include or exclude a portion of the audio-visual media from at least one of the transcript, the transcript summary, or the video summary, to include or exclude a portion of the transcript from at least one of the transcript summary or the video summary, or to exclude filler words from at least one of the transcript, the transcript summary, or the video summary.

Example 65. The computer apparatus according to Example 63 and or another example herein, further comprising means to retrain at least one of the transcription neural network or the summarization neural network based on the user change to at least one of the transcript, the transcript summary, or the video summary.

Example 66. The computer apparatus according to Example 47 and or another example herein, wherein at least one of the transcription neural network or the summarization neural network are part of a transformer architecture.

Example 67. The computer apparatus according to Example 47 and or another example herein, further comprising means to instantiate a plurality of encoder-decoder layers for at least one of the transcription neural network or the summarization neural network.

Example 68. The computer apparatus according to Example 47 and or another example herein, further comprising means to convert the audio-visual media into a plurality of vectors or tensors and means to feed at least one of the transcription neural network or the summarization neural network the plurality of vectors or tensors.

Example 69. The computer apparatus according to Example 47, further comprising means to convert the transcript into a plurality of vectors or tensors and means to feed the summarization neural network the plurality of vectors or tensors.

Example 70. One or more computer-readable media comprising instructions that cause a computer device, in response to execution of the instructions by a processor of the computer device, to summarize an audio-visual media, wherein to summarize the audio-visual media, the instructions are to cause the computer device to obtain the audio-visual media, perform a transcription neural network to prepare a transcript of the audio-visual media, perform a summarization neural network to prepare a transcript of the audio-visual media, perform a summarization neural network to prepare a transcript summary of the transcript of the audio-visual media, and to output the transcript summary.

Example 71. The computer-readable media according to Example 70 and or another example herein, further wherein the instructions further cause the computer device to prepare and output a video summary of the audio-visual media, wherein the video summary of the audio-visual media comprises portions of the audio-visual media corresponding to the transcript summary.

Example 72. The computer-readable media according to Example 70 and or another example herein, wherein to perform the summarization neural network to prepare the transcript summary the instructions are further to cause the computer device to provide the summarization neural network with the transcript and the audio-visual media, and with the summarization neural network, to identify a plurality of sentence meaning clusters in the transcript based on the transcript and the audio-visual media and wherein to prepare the transcript summary further comprises to select a number of sentences from the plurality of sentence meaning clusters.

Example 73. The computer-readable media according to Example 72, wherein to provide the summarization neural network with the transcript and the audio-visual media comprises to provide the summarization neural network with vectors and or tensors derived from the transcript and the audio-visual media.

Example 74. The computer-readable media according to Example 72 and or another example herein, wherein to identify sentence meaning clusters comprises to provide the summarization neural network with the transcript and the audio-visual media and wherein the instructions further cause the computer device to identify sentence meaning clusters using at least one of on an unsupervised neural network and a supervised neural network of the summarization neural network.

Example 75. The computer-readable media according to Example 74 and or another example herein, wherein the unsupervised neural network is a term frequency-inverse document frequency encoding neural network and the supervised network is a summarization-trained neural network.

Example 76. The computer-readable media according to Example 75 and or another example herein, wherein a training dataset for the supervised network comprises at least one of a plurality of audio-visual media and the transcript.

Example 77. The computer-readable media according to Example 76 and or another example herein, wherein at least one of the plurality of audio-visual media and the transcript are annotated with a human feedback regarding summary status and not summary status.

Example 78. The computer-readable media according to Example 77 and or another example herein, wherein the instructions further cause the computer device to obtain the human feedback from an audio-visual media playback application, wherein the audio-visual media playback application obtains the feedback from audience members.

Example 79. The computer-readable media according to Example 78 and or another example herein, wherein the human feedback comprises at least one of an upvote, a downvote, a like, an emoji, a clap, a thumbs up, a heart, a cry, a wow, an anger, a laughter, or a comment.

Example 80. The computer-readable media according to Example 72 and or another example herein, wherein the instructions further cause the computer device to select a number of sentence meaning clusters in the plurality of sentence meaning clusters based on a user-specified length of the video summary of the audio-visual media or a user-specified percentage of audio-visual media.

Example 81. The computer-readable media according to Example 72 and or another example herein, wherein to select the number of sentences from the plurality of sentence meaning clusters comprises to select a highest ranking sentence in a sentence meaning cluster, a highest ranking sentence which is most dissimilar from sentences in other sentence meaning clusters, or a number of sentences from each of the sentence meaning clusters.

Example 82. The computer-readable media according to Example 72 and or another example herein, wherein the instructions further cause the computer device to categorize sentences as summary sentences or not summary sentences with the summarization neural network and wherein to select the number of sentences selected from the plurality of sentence meaning clusters are sentences categorized as summary sentences.

Example 83. The computer-readable media according to Example 70 and or another example herein, wherein the instructions further cause the computer device to prepare the transcript with the transcription neural network comprising words and punctuation.

Example 84. The computer-readable media according to Example 70 and or another example herein, wherein the instructions further cause the computer device to traine the transcription neural network on a training data set comprising audio-visual media annotated with text and punctuation corresponding to text, spoken words, and punctuation in the audio-visual media.

Example 85. The computer-readable media according to Example 70 and or another example herein, wherein the instructions further cause the computer device to remove filler words from at least one of the transcript, the transcript summary, or the video summary.

Example 86. The computer-readable media according to Example 70 and or another example herein, wherein the instructions further cause the computer device to obtain a user feedback regarding at least one of the audio-visual media, the transcript, the transcript summary, or the video summary.

Example 87. The computer-readable media according to Example 86 and or another example herein, wherein the user feedback comprises at least one of an instruction to include or exclude a portion of the audio-visual media from at least one of the transcript, the transcript summary, or the video summary, to include or exclude a portion of the transcript from at least one of the transcript summary or the video summary, or to exclude filler words from at least one of the transcript, the transcript summary, or the video summary.

Example 88. The computer-readable media according to Example 86 and or another example herein, wherein the instructions further cause the computer device to retrain at least one of the transcription neural network or the summarization neural network based on the user change to at least one of the transcript, the transcript summary, or the video summary.

Example 89. The computer-readable media according to Example 70 and or another example herein, wherein at least one of the transcription neural network or the summarization neural network are part of a transformer architecture.

Example 90. The computer-readable media according to Example 70 and or another example herein, wherein the instructions further cause the computer device to instantiate a plurality of encoder-decoder layers for at least one of the transcription neural network or the summarization neural network.

Example 91. The computer-readable media according to Example 70 and or another example herein, wherein the instructions further cause the computer device to convert the audio-visual media into a plurality of vectors or tensors and to feed at least one of the transcription neural network or the summarization neural network the plurality of vectors or tensors.

Example 92. The computer-readable media according to Example 70, wherein the instructions further cause the computer device to convert the transcript into a plurality of vectors or tensors and to feed the summarization neural network the plurality of vectors or tensors.

The invention claimed is:

1. An apparatus for summarizing an audio-visual media, comprising:
    a computer processor and a memory; and
    an audio-visual media synopsis module in the memory to summarize the audio-visual media, wherein to summarize the audio-visual media, the computer processor is to perform the audio-visual media synopsis module and is to thereby obtain the audio-visual media, perform a transcription neural network to prepare a transcript of the audio-visual media, perform a summarization neural network to prepare a transcript summary of the transcript of the audio-visual media, and wherein the audio-visual media synopsis module is to output the transcript summary, wherein the audio-visual media synopsis module is further to prepare and output a video summary of the audio-visual media, wherein the video summary of the audio-visual media comprises portions of the audio-visual media corresponding to the transcript summary;
    wherein the audio-visual media synopsis module is further to provide the summarization neural network with the transcript and the audio-visual media and wherein to prepare the transcript summary, the summarization neural network is to identify a plurality of sentence meaning clusters in the transcript based on the transcript and the audio-visual media and wherein to prepare the transcript summary further comprises to select a number of sentences from the plurality of sentence meaning clusters.

2. The apparatus according to claim 1, wherein sentence meaning clusters are to be identified by the summarization neural network using at least one of on an unsupervised neural network and a supervised neural network, wherein the unsupervised neural network is a term frequency-inverse document frequency encoding neural network and the supervised network is a summarization-trained neural network.

3. The apparatus according to claim 2, wherein a training dataset for the supervised network comprises at least one of a plurality of audio-visual media and the transcript, wherein at least one of the plurality of audio-visual media and the transcript are annotated with a human feedback regarding summary status and not summary status.

4. The apparatus according to claim 1, wherein a number of sentence meaning clusters in the plurality of sentence meaning clusters are identified based on a user-specified length of the video summary of the audio-visual media or a user-specified percentage of audio-visual media.

5. The apparatus according to claim 1, wherein the summarization neural network is further to categorize sentences as summary sentences or not summary sentences and wherein the number of sentences selected from the plurality of sentence meaning clusters are sentences categorized as summary sentences.

6. An apparatus for summarizing an audio-visual media, comprising:
    a computer processor and a memory; and
    an audio-visual media synopsis module in the memory to summarize the audio-visual media, wherein to summarize the audio-visual media, the computer processor is to perform the audio-visual media synopsis module and is to thereby obtain the audio-visual media, perform a transcription neural network to prepare a transcript of the audio-visual media, perform a summarization neural network to prepare a transcript summary of the transcript of the audio-visual media, and wherein the audio-visual media synopsis module is to output the transcript summary, wherein the audio-visual media synopsis module is further to prepare and output a video summary of the audio-visual media, wherein the video summary of the audio-visual media comprises portions of the audio-visual media corresponding to the transcript summary;

wherein the audio-visual media synopsis module is further to remove filler words from at least one of the transcript, the transcript summary, or the video summary.

7. A computer implemented method for summarizing an audio-visual media, comprising:

obtaining the audio-visual media, performing a transcription neural network to prepare a transcript of the audio-visual media, performing a summarization neural network to prepare a transcript summary of the transcript of the audio-visual media, and outputting the transcript summary, and preparing and outputting a video summary of the audio-visual media, wherein the video summary of the audio-visual media comprises portions of the audio-visual media corresponding to the transcript summary, wherein performing the summarization neural network to prepare the transcript summary comprises providing the summarization neural network with the transcript and the audio-visual media and, with the summarization neural network, identifying a plurality of sentence meaning clusters in the transcript based on the transcript and the audio-visual media and wherein to prepare the transcript summary further comprises selecting a number of sentences from the plurality of sentence meaning clusters.

8. The method according to claim 7, wherein identifying sentence meaning clusters comprises providing the summarization neural network with the transcript and the audio-visual media and identifying sentence meaning clusters using at least one of on an unsupervised neural network and a supervised neural network of the summarization neural network.

9. The method according to claim 8, wherein a training dataset for the supervised network comprises at least one of a plurality of audio-visual media and the transcript, wherein at least one of the plurality of audio-visual media and the transcript are annotated with a human feedback regarding summary status and not summary status.

10. The method according to claim 9, further comprising obtaining the human feedback from an audio-visual media playback application, wherein the audio-visual media playback application obtains the feedback from audience members.

11. The method according to claim 7, further comprising selecting a number of sentence meaning clusters in the plurality of sentence meaning clusters based on a user-specified length of the video summary of the audio-visual media or a user-specified percentage of audio-visual media.

12. The method according to claim 7, further comprising categorizing sentences as summary sentences or not summary sentences with the summarization neural network and wherein selecting the number of sentences selected from the plurality of sentence meaning clusters are sentences categorized as summary sentences.

13. The method according to claim 7, further comprising removing filler words from at least one of the transcript, the transcript summary, or the video summary.

14. A computer apparatus for summarizing an audio-visual media, comprising:

means to obtain the audio-visual media, means to perform a transcription neural network to prepare a transcript of the audio-visual media, means to perform a summarization neural network to prepare a transcript of the audio-visual media, means to perform a summarization neural network to prepare a transcript summary of the transcript of the audio-visual media, means to output the transcript summary, and means to prepare and output a video summary of the audio-visual media, wherein the video summary of the audio-visual media comprises portions of the audio-visual media corresponding to the transcript summary;

wherein means to perform the summarization neural network to prepare the transcript summary comprises means to provide the summarization neural network with the transcript and the audio-visual media, with the summarization neural network, means to identify a plurality of sentence meaning clusters in the transcript based on the transcript and the audio-visual media and wherein to prepare the transcript summary further comprises means to select a number of sentences from the plurality of sentence meaning clusters.

15. The computer apparatus according to claim 14, wherein means to identify sentence meaning clusters comprises means to provide the summarization neural network with the transcript and the audio-visual media and means to identify sentence meaning clusters using at least one of on an unsupervised neural network and a supervised neural network of the summarization neural network.

16. The computer apparatus according to claim 15, wherein the unsupervised neural network is a term frequency-inverse document frequency encoding neural network and the supervised network is a summarization-trained neural network.

17. The computer apparatus according to claim 15, wherein a training dataset for the supervised network comprises at least one of a plurality of audio-visual media and the transcript and wherein at least one of the plurality of audio-visual media and the transcript are annotated with a human feedback regarding summary status and not summary status.

18. The computer apparatus according to claim 17, further comprising means to obtain the human feedback from an audio-visual media playback application, wherein the audio-visual media playback application obtains the feedback from audience members.

* * * * *